(12) United States Patent
Williams, Jr. et al.

(10) Patent No.: US 12,397,519 B2
(45) Date of Patent: Aug. 26, 2025

(54) MULTI-MATERIAL HALFTONING OF ADDITIVELY MANUFACTURED OPTICS

(71) Applicant: Vadient Optics, LLC, Tualatin, OR (US)

(72) Inventors: George Melville Williams, Jr., Vashon, WA (US); John Paul Harmon, Albany, OR (US)

(73) Assignee: Vadient Optics, LLC, Tualatin, OR (US)

(*) Notice: Subject to any disclaimer, the term of this patent is extended or adjusted under 35 U.S.C. 154(b) by 0 days.

(21) Appl. No.: 18/834,456

(22) PCT Filed: Apr. 23, 2024

(86) PCT No.: PCT/US2024/025788
§ 371 (c)(1),
(2) Date: Jul. 30, 2024

(87) PCT Pub. No.: WO2024/226472
PCT Pub. Date: Oct. 31, 2024

(65) Prior Publication Data
US 2024/0424754 A1    Dec. 26, 2024

Related U.S. Application Data

(60) Provisional application No. 63/498,663, filed on Apr. 27, 2023.

(51) Int. Cl.
*B29D 11/00* (2006.01)
*B33Y 50/02* (2015.01)
*B33Y 80/00* (2015.01)

(52) U.S. Cl.
CPC ........ *B29D 11/00355* (2013.01); *B33Y 50/02* (2014.12); *B33Y 80/00* (2014.12)

(58) Field of Classification Search
None
See application file for complete search history.

(56) References Cited

U.S. PATENT DOCUMENTS 6,169,605 B1    1/2001  Penn et al.
9,555,623 B1    1/2017  Williams et al.
(Continued)

FOREIGN PATENT DOCUMENTS

CN        113015983 A  *  6/2021  ............ G06F 17/15
JP          3884294 B2  *  2/2007
WO    WO-2021255337 A1  *  12/2021

OTHER PUBLICATIONS

Galli, A. et al., "3D Imaging of Buried Dielectric Targets with a Tomographic Microwave Approach Applied to GPR Synthetic Data," International Journal of Antennas and Propagation, vol. 2013, Aug. 27, 2013, 10 pages.
(Continued)

*Primary Examiner* — Thomas C Lee
*Assistant Examiner* — Anzuman Sharmin
(74) *Attorney, Agent, or Firm* — Alleman Hall & Tuttle LLP

(57) ABSTRACT

A device comprises an array of voxels of solidified material defining at least one scan path, along which an error in a variable dielectric quantity at a target voxel is distributed by successive deposition and solidifying of a selected material along the scan path, in accordance with a prescription for the device. The prescription defines the dielectric quantity over the array of voxels.

29 Claims, 8 Drawing Sheets

(56) References Cited

U.S. PATENT DOCUMENTS

| | | | |
|---|---|---|---|
| 2013/0236198 A1* | 9/2013 | Yeh | G03G 15/556 399/24 |
| 2014/0312535 A1* | 10/2014 | Dikovsky | B33Y 50/00 264/401 |
| 2017/0173957 A1* | 6/2017 | Williams | B41J 2/164 |
| 2019/0193204 A1 | 6/2019 | Houbertz et al. | |
| 2020/0158860 A1 | 5/2020 | Morton | |
| 2020/0271454 A1 | 8/2020 | Kato | |

OTHER PUBLICATIONS

ISA United States Patent and Trademark Office, International Search Report and Written Opinion Issued in Application No. PCT/US2024/025788, Jul. 3, 2024, WIPO, 9 pages.

* cited by examiner

MULTI-MATERIAL HALFTONING OF ADDITIVELY MANUFACTURED OPTICS

CROSS REFERENCE TO RELATED APPLICATIONS

This application is a U.S. National Phase of International Patent Application Serial No. PCT/US24/25788 entitled "MULTI-MATERIAL HALFTONING OF ADDITIVELY MANUFACTURED OPTICS", filed 23 Apr. 2024, which claims priority to U.S. Provisional Patent Application Ser. No. 63/498,663 filed 27 Apr. 2023, the entirety of each of which is hereby incorporated herein by reference, for all purposes.

TECHNICAL FIELD

This disclosure relates to additive manufacture of optics and, more particularly, to additive manufacture of optics with inhomogeneous dielectric properties.

BACKGROUND

Additive manufacture (AM) can be used to make optical devices with inhomogeneous dielectric properties. Such optics can be used to manipulate electromagnetic (EM) radiation of various wavelength bands. There are practical limitations, however, in the number of feedstock materials that a state-of-the-art AM system can concurrently handle and apply to an optic or other article.

SUMMARY

One aspect of this disclosure relates to a method of manufacture of a device. The method comprises (a) receiving a prescription defining a variable dielectric quantity over an array of target voxels; (b) for each target voxel of the array, selecting for deposition at the target voxel, a material that, when deposited and solidified, urges the dielectric quantity at the target voxel toward a value prescribed for the target voxel according to the prescription, estimating an error between the dielectric quantity at the target voxel and the value prescribed for the target voxel, and compensating the error by selection of a material for deposition at a voxel adjacent the target voxel. In this method, the acts of selecting estimating, and compensating in (b) yields, for each material selected, a corresponding print map associating an amount of the material to each target voxel of the array. The method further comprises (c) depositing each material selected according to the corresponding print map; and (d) solidifying each material as deposited.

Another aspect of this disclosure relates to a device comprising an array of voxels of solidified material defining at least one scan path, along which an error in a variable dielectric quantity at a target voxel is distributed by successive deposition and solidifying of a selected material along the scan path, in accordance with a prescription for the device. Here the prescription defines the dielectric quantity over the array of voxels.

This Summary is provided in order to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

DETAILED DESCRIPTION

1

As noted above, AM can be used to make optical devices with inhomogeneous dielectric properties. For most applications, the spatially varying dielectric properties sought for a device are defined at high or arbitrary precision. By contrast, the 3D printers used for AM are loaded with a finite number of feedstock materials, offering a finite selection of dielectric properties at the deposition stage. In some scenarios, interdiffusion of adjacent material droplets with different dielectric properties can be leveraged or controlled to provide relatively smooth dielectric-property transitions. Nevertheless, the inventors herein have discovered that the imagining fidelity of optical devices manufactured from a limited pallet of materials can be further improved when the quantization error at a given deposition site is diffused systematically over neighboring deposition sites.

Figure 1:
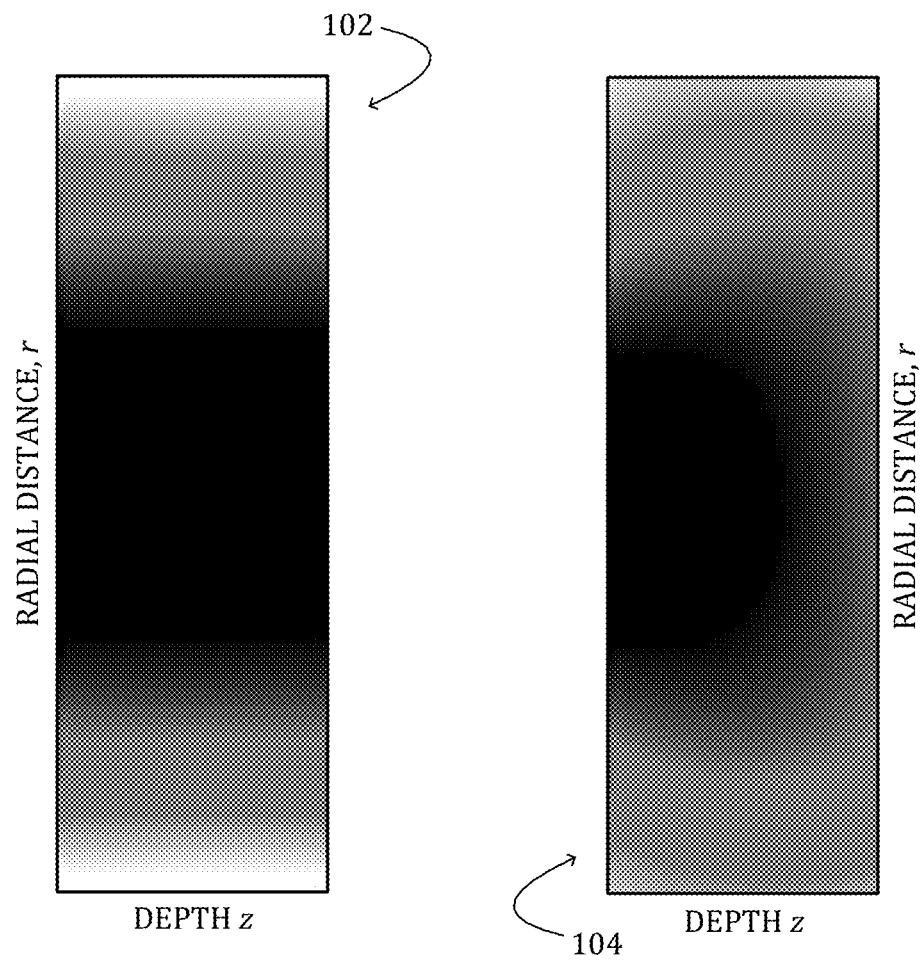
FIG. 1 shows cross-sectional maps of refractive index for two example GRIN optical devices.

Turning now to the drawings, FIG. 1 shows r-z cross sections of two, radially symmetric, gradient-dielectric optical devices. Radially symmetric device 102 has a cylindrical index distribution with an index that changes radially, with no variation in radial distribution along the optical (z) axis. Radially symmetric device 104 has a radial distribution that varies as a function of the position along the optical axis. In these devices, the dark region may represent a relatively high-index region that forms a gradient to a relatively low-index region at the edges.

Such devices may be printed via halftoning methods, such as error diffusion, as described herein. These methods determine where two or more materials may be deposited such that when printed, the gradient profiles match those of the design map. Using two materials, a binary thresholding and halftoning may be used. With three or more materials, multi-level threshold and halftoning may be used to create bitmaps for each material.

Figure 2:
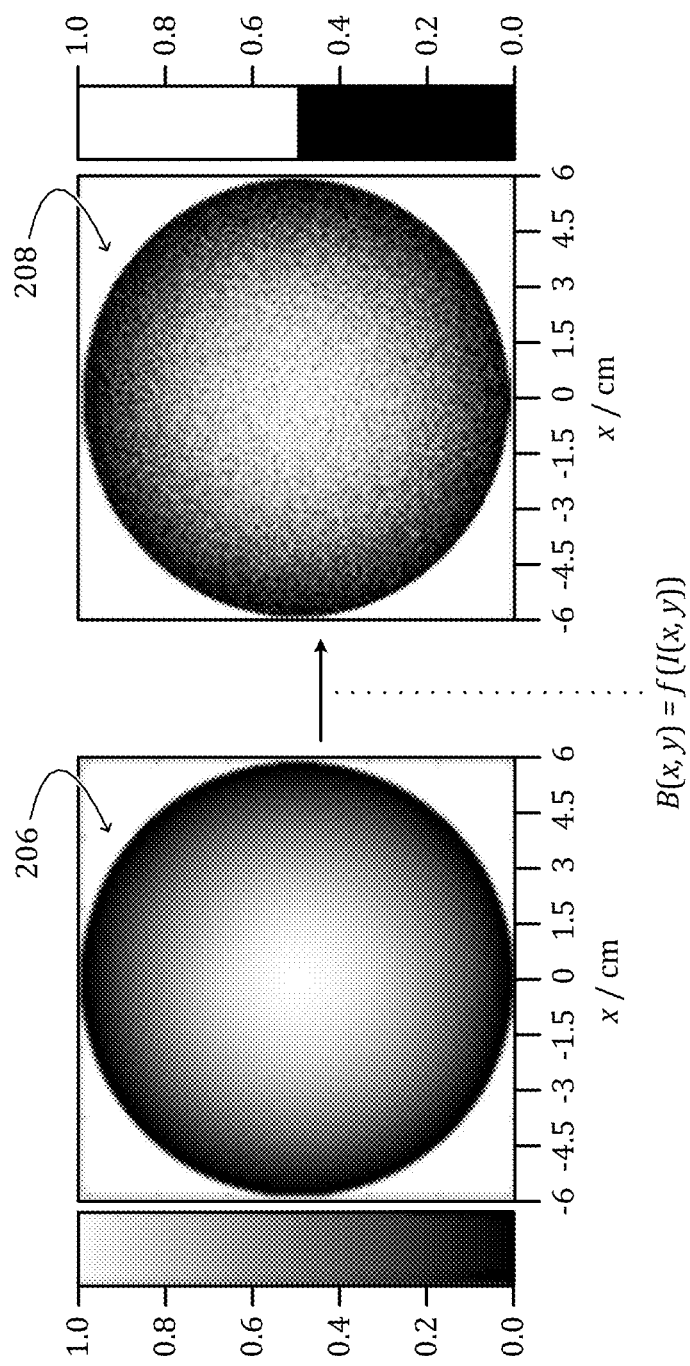
FIG. 2 shows a front view of an example, radially symmetric gradient dielectric-property (GDP) device and a corresponding, error-diffused, 2-value print map.

FIG. 2 shows is a front view of an example, radially symmetric GDP device 206. The center of the device has one index value, which may be a high index value; the edges of the device have different index values, which may be lower. The radial distribution may be described by $$n(x, y, z) = n0 + \Delta n(r_2 r^2 + r_4 r^4 + r_6 r^6 + z_1 z + z_2 z^2 + r_2 z_1 r^2 z + r_2 z_2 r^2 z^2 \ldots),$$

where n(x, y, z) is the refractive-index value at the (x, y, z) coordinate, n0 is the base index value, and r=sqrt (x^2+y^2) is the radius.

Print map 208, corresponding to one of low-index materials, shows the placement of that material during the build of one layer of device 206, as fabricated using a binary optical-ink pair. A complement to this bitmap would also be computed for the second material used to fabricate the device. If additional materials were used to construct each layer, then a different bitmap would be generated for each material.

Figure 3:
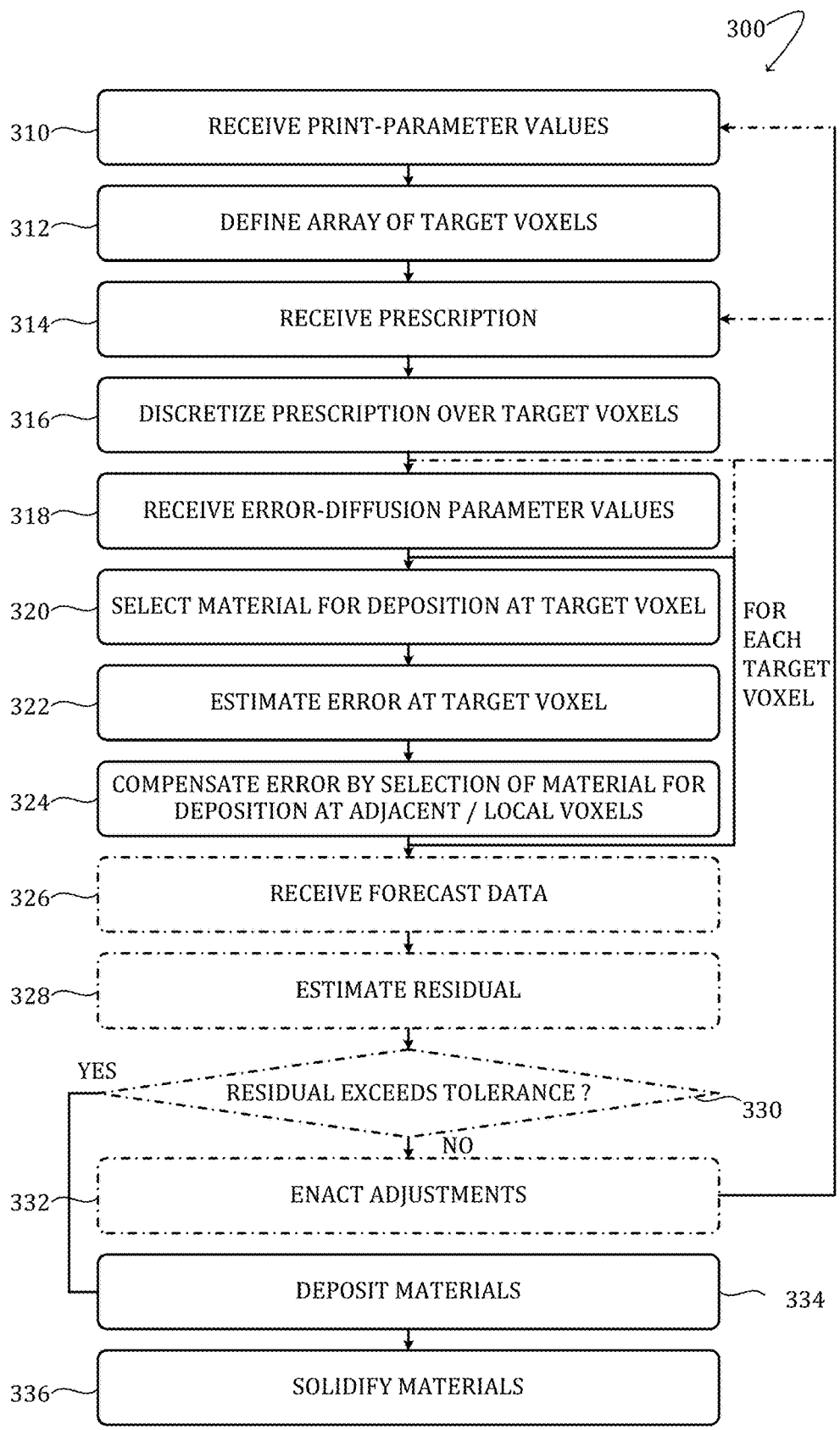
FIG. 3 shows aspects of an example method of additive manufacture of a device.

FIG. 3 shows aspects of an example method 300 of additive manufacture of a device. As noted hereinabove, the device may comprise a plurality of different materials—e.g., materials having different refractive indices and other dielectric properties. In some examples the manufactured device is an optical device, such as a GRIN optic. The terms 'optical device' and 'optic' should not be construed to limit the range of wavelengths over which the device may be operative. Method 300 can be used to make optical devices operative in the radio-frequency band, the millimeter-wave band, the microwave band, the infrared or near-infrared bands, or the visible or ultraviolet bands, for example.

Method 300 invokes terms and concepts described in further detail hereinafter. In some examples at least a portion of method 300 is enacted by a software product called an 'halftoner' in this disclosure. The term 'optimizer' may also be used. In some examples the halftoner may be integrated into other manufacturing software and/or equipment.

At 310 the halftoner receives a set of print-parameter values. In some examples the set of print-parameter values includes a drop-size parameter value, a drop-volume parameter value, a drop-resolution parameter value, a drop-diffusivity parameter value, and/or a print-accuracy parameter value.

At 312 the halftoner defines an array of target voxels of the device based on the print-parameter values. The term 'voxel' refers herein to a volume element or deposition site of an additively manufactured device. Generally speaking, the array of target voxels is a three-dimensional array in three corresponding coordinates—e.g., x, y, z. In some examples the drop-size parameter value controls the center-to-center distance between adjacent voxels.

At 314 the halftoner receives a prescription defining a variable dielectric quantity over the array of target voxels. The variable dielectric quantity defined by the prescription may vary as a function of any, some or all of the coordinates. The dielectric quantity may comprise a scalar representing the refractive index at one wavelength, a vector representing the refractive index at two or more wavelengths, one or more dispersion parameters, one or more partial-dispersion parameters, or a parameterized polynomial representation such as a Sellmeier or Cauchy representation, Zernike coefficients, Fourier coefficients, wavelet coefficients, as examples, Other dielectric quantities are also envisaged. In some examples the halftoner may prefilter the prescription to improve device quality or to compensate for process parameters such as material interdiffusion, print precision, and/or resolution.

In some examples the halftoner may analyze the prescription based on pre-defined characteristics, such as frequency content, the orientation and/or magnitude of gradients, regions of high spatial information, or regions of high flux or power. Such analysis may identify design features that should be preserved or emphasized—edges, lines, or spatial structures, for instance. In some examples the design features identified in this manner may be masked from the subsequent error-diffusion algorithm (vide infra) by presetting the corresponding voxels to a preset level. Analysis of the prescription may also include a determination of how the features identified should influence the selection of threshold levels and other parameter values of the error-diffusion algorithm. In some examples such analysis may determine a scheme for adjusting the threshold levels and path trajectories, to ensure that the features identified are accurately represented in the fabricated device.

In some examples analysis of the prescription may determine a scan path (vide infra) that distributes error away from an identified feature or other critical area. More particularly, the scan path may be aligned to the intended trajectory of radiation traversing the device when the device is in use. In some examples the scan path is determined based on the magnitude and direction of one or more gradients of the prescription. In some examples the scan path is serpentine in two or more dimensions. In some examples the scan path is defined based on spatial and/or volumetric content of the prescription. In some examples the scan path comprises a raster-scan path, a random-scan path, a space-filling scan path, a serpentine scan path, or a spiral-in scan path. In some examples the scan path initiates at the surface of the device that first intercepts an incident-radiation wavefront. In some examples the scan path is defined relative to the path of highest flux, power, or dispersion of incident radiation through the device.

In some examples analysis of the prescription may determine the kernel size and kernel coefficients that manage the distribution of error relative to the prescriptive content. In some examples, the size and shape of the error diffusion kernel may be adjusted in order to better capture and distribute errors in regions of interest. For example, the kernel size may be increased in areas with complex gradients or high spatial variation to ensure that errors are distributed effectively across neighboring voxels. More particularly, the kernel size may be decreased in areas with smooth gradients or low spatial variation to avoid over-smoothing and thereby preserve fine details.

In other examples, kernel coefficients may be increased along directions corresponding to gradients or edges, to enhance error diffusion in these directions. This may include adjusting the coefficients to compensate for material diffusion. In other examples, the coefficients may be reduced along directions with low gradient or contrast, to minimize unnecessary diffusion and maintain device fidelity. In other examples one or more kernel coefficients may be adapted based on local gradient variations, to dynamically optimize error diffusion according to the specific characteristics of each voxel neighborhood.

In yet other examples, one or more of the threshold levels may be set or adjusted based on analysis of the prescription and the anticipated impact of the error-diffusion parameter values. For example, a higher threshold may be set for regions with smooth gradients or low spatial variation, where quantization errors are less perceptible and can be tolerated without significant loss of fidelity. In another example, a lower threshold may be set for regions with sharp edges, high contrast, or fine details, where preserving accuracy and minimizing quantization errors are paramount. In still other examples, an adaptive thresholding scheme may be developed to dynamically adjust the threshold level based on local gradient variations, prescription content, or structural characteristics.

In some examples analysis of the prescription may guide the selection of one or more feedback mechanisms that monitors the distribution of errors and adjust the threshold levels during the error-diffusion process. This aspect may incorporate user-defined criteria or performance metrics to regulate the threshold adjustment and ensure that the fabricated device meets specified tolerances.

At 316 the halftoner discretizes the prescription over the array of target voxels. The discretizing step may include interpolating or decimating the prescription among the array of target voxels. In more particular variants the discretizing step may include decomposing the prescription into a set of orthogonal basis functions evaluated at each target voxel of the array.

In order to facilitate layer-by-layer fabrication, discretizing at 316 may include slicing the 3D prescription into a plurality of thin layers each perpendicular to the deposition direction. Specialized software may be used for this purpose. More particularly, after importing the prescription, fabrication parameters such as layer height and print speed are set. The software may then generate the layers based on the model geometry and parameters. The various toolpaths (i.e., print paths) may be reviewed to ensure proper coverage and minimize errors, and simulations may be conducted to predict and address potential issues.

At 318 the halftoner receives a set of error-diffusion parameter values. In addition to the voxel path strategy, the set of error-diffusion parameter values may include one or more threshold values, a multi-dimensional kernel of specific size and shape, and kernel coefficient values. A threshold value is a decision-making criterion based on one or more metrics and set according to the bit depth or the range of values the voxels can take. The threshold value is compared to the intended voxel value inclusive of any accumulated distributed error from previous processed voxels, to determine if a material will be deposited or not, and which specific material may be deposited. The kernel size and kernel shape define a kernel of voxels adjacent to the target voxel and a set of kernel coefficients controlling a distribution of the error among the kernel of voxels. Generally speaking, the prescription and the print- and error-diffusion parameter values may be received and stored in any suitable data structure of a digital computer.

In some examples the threshold values may be dynamically adjusted via a feedback mechanism based on error diffusion from earlier voxels of the scan path. In some examples two or more thresholds may be used individually or may be logically combined. A plurality of thresholds may be used for example, to analyze the vector formed by index values defined at multiple wavelengths, or to define regions of select index magnitudes.

In some examples the set of error-diffusion parameter values may be adjusted dynamically according to one or more design-specific properties of the device. Such properties may include the presence of points and lines, for instance. In more particular examples, the dynamic adjustment may include analyzing the location and magnitude of gradient changes, the contrast, the frequency spectrum of compositional variations, the presence of dimensional symmetry, the precise trajectory of radiation through the device, and/or the distribution of radiation flux within it. This tailored approach ensures that the error-diffusion process is finely optimized to address the unique optical and physical characteristics of the device, leading to superior performance and functionality. Despite the advantages of dynamic adjustment of the error-diffusion parameter values, such values may remain fixed in some examples.

For each target voxel of the array, the halftoner, at 320, selects for deposition at the target voxel, a material that, when deposited and solidified, urges the dielectric quantity at the target voxel toward a value prescribed for the target voxel according to the prescription. The term 'urges' is used herein to convey the idea that the dielectric-quantity value prescribed for a given target voxel is unlikely to exactly match the value of any of the materials available for deposition—e.g., materials loaded concurrently into a 3D printer. Accordingly, the material to be deposited at a given voxel is selected based on its estimated ability to urge the dielectric quantity as close as possible to the prescribed value. In some examples and scenarios, such estimation takes inter-drop diffusion into account. In some examples, such estimation takes into account the dielectric-quantity error accumulated from previous voxels along a scan path, as described in detail hereinafter. In some examples the material may be selected from a pallet of materials usable concurrently in a printing apparatus. The term 'ink' can be used to refer to a material which is liquid in the uncured state, or prior to solidification (vide infra).

In some variants a single material is selected from the pallet of available materials—viz., the material that most closely approximates the desired value of the dielectric quantity at the target voxel, according to the prescription. In other words, inter-drop diffusion may be handled as a second-order effect. Within the entire set of overlaid print maps, accordingly, only one bit would be set for each target voxel. In other variants, however, a mixture of two or more materials selected from the pallet may be used, for at least some target voxels, to urge the dielectric quantity as close as possible to its prescribed value. Here the inter-drop diffusion would be very important indeed and may be assumed to occur completely (or nearly so) on the timescale of the deposition. Accordingly, the set of overlaid print maps may have more than one set bit for at least some of the target voxels. Rather, a plurality of bits may be used to specify the quantity of each material to be deposited. In some examples, this variant provides greater flexibility in setting the desired dielectric quantity and achieving the desire chromaticity (e.g., achromaticity).

At 322 the halftoner estimates the error between the dielectric quantity at the target voxel, after solidification, and the value or values prescribed for the target voxel. At this stage of processing, the difference between voxel prescription value, as modified by any previously distributed error from other voxels, is compared to the threshold or thresholds. If it exceeds the threshold value(s), then the material is selected, and the difference between the closest available material or dielectric value in the palette and the value that was in the prescription (as modified by distributed error) is distributed to the neighboring voxels. For example, for a scale of 0 to 255, the ink has an index value of 233, and the threshold was 128, then the error of 233−128=105 is distributed to the neighbors in 3D. In examples in which the dielectric quantity is a function of wavelength, the error may be estimated at two or more wavelengths, in which case a plurality of weighted thresholds may be used. In examples in which the dielectric quantity is single-valued, a composite of one or more parameterized characteristic values, multiple weighted thresholds may also be used.

At 324 the halftoner compensates for the error or errors by selection of a material for deposition at a voxel adjacent the target voxel. The error may be compensated according to an error-diffusion algorithm that distributes the error from each target voxel to one or more voxels adjacent and/or local to the target voxel in one, two, or three directions. In some examples the error-diffusion algorithm operates according to the set of error-diffusion parameter values received at 318.

These error-diffusion parameter coefficients are represented in a kernel of a given size and shape.

In some examples, the error-diffusion algorithm is coordinated with the set of print-parameter values received at 310. In more particular examples, the error-diffusion algorithm may comprise a spatially adaptive algorithm, a multi-scale algorithm, a depth-dependent algorithm, a power-dependent algorithm, a flux-dependent algorithm a optical-path-dependent algorithm, a content-aware algorithm, and/or a fractal-diffusion algorithm, in which the size of the kernel, the shape of the kernel, and the kernel coefficients may be dynamically adjusted as a position of voxel location, or between passes.

In another example, the error-diffusion algorithm estimates the effect of process conditions, such as physical diffusion, and updates one or more subsequent thresholds, kernel parameters, or kernel coefficients, based on the material placement decision. In further examples, this may include consideration of the radiation path, the local power, the magnitude and orientation of gradients, the structure of the prescription, or spatial features. In examples in which any, some, or all of the error-diffusion parameter values are adjusted dynamically by the error-diffusion algorithm, the method returns to 318 to process the subsequent target voxel; in examples in which the error-diffusion parameter values are static, the method returns to 320.

Taken together, the acts of selecting the material at 320, estimating the error at 322, and compensating the error at 324 yields, for each material selected, a corresponding print map associating an amount of that material to each target voxel of the array. In some examples, each print map takes the form of a bitmap.

In one, non-limiting example, the print maps accumulated by looping through 320-324 are converted into a voxelized 3D map of the dielectric quantity—e.g., refractive index at one or more wavelengths. The material print maps may then be processed or convolved with process parameters to represent the result output from manufacturing. The raw or processed voxelated 3D material print map may then be compared to the original prescription to assess the level of fidelity.

The process flow of method 300 recognizes that when a droplet of liquid material is placed at a target voxel it diffuses with droplets of neighboring voxels according to one or more concentration gradients. This effect underscores the value of pre-processing the prescription to account for material diffusion. Further, when a droplet is placed at a particular voxel during processing, because it diffuses into the neighboring voxels the placement of the material effects all neighboring voxels, including those that have already been processed. This phenomenon influences the error diffusion coefficients, because of the reaching influence across multiple voxels of the material placement. This effect highlights the value of dynamic adjustment of error-diffusion parameter values during the scan path. If one places material at a given voxel and knows it is going to diffuse into the next voxel, then it may be beneficial to dynamically increase the threshold by an computed amount. Because nanoparticles flow from areas of high concentration to areas of low concentration, it may be desirable to use a scan path that starts in the areas of high concentration and spirals out to the areas of lower concentration. This allows the error diffusion to propagate in the same direction as material diffusion.

In examples in which two or more different materials are selected for a given target voxel (the second variant described in connection to 320), error diffusion may be enacted based on a threshold for each material selected. Since placement of the material drives the concentration to 100%, the errors for each of the materials may be distributed to the neighbors of the target voxel. Some methods advantageously link the percentage composition of nanoparticle dopants in the materials to physical diffusion properties, thereby enabling the precise control of refractive index and dispersion characteristics, to minimize chromatic aberrations and enhance the optical performance of the device. This approach is illustrated in the following algorithms.

---
Algorithm 1. Fabricating a GRIN lens.
---

1. Define a set of optical materials, each with distinct refractive index and dispersion characteristics, wherein the materials include a mix of four to six components, each component may comprise nanoparticle dopants.
2. Establish a target optical performance for a GRIN lens, including desired refractive index profiles and minimized chromatic aberrations across the lens.
3. Create an initial design by specifying a continuous spatial distribution of the set of optical materials across the GRIN lens, wherein the percentage composition of each material at any given point sums to 100%,
4. Compute an initial optical error based on the difference between the optical performance of the initial design and the target optical performance, wherein the optical error includes deviations in both refractive index and chromatic aberrations.
5. Apply an error-diffusion algorithm to adjust the percentage compositions of the materials at each point within the GRIN lens, wherein the error diffusion involves redistributing the computed optical error to neighboring points to optimize the overall design, and wherein the error diffusion is based not on direct refractive index values and dispersion at each location but on the percentage of each material selected.
6. Iteratively refine the percentage compositions of the materials through successive applications of the error diffusion algorithm until the optical error across the GRIN lens is minimized to within acceptable limits.
7. Verify the optical performance of the refined design against the target optical performance.
8. Fabricate the GRIN lens based on the refined design, wherein the lens is constructed to have spatial variations in material composition according to the optimized percentage compositions resulting from the error diffusion process.

---

In more particular examples, two or more materials may be depositing on top of each other, before curing, Rather than just deposit one material at each voxel location, driving its concentration to 100%, it is possible to print layers, one on top of another, before curing, so that they mix. This allows selection two, three, or more materials, with some loss of resolution in z. Consider the following algorithm.

---
Algorithm 2. Fabricating a multi-material GRIN lens.
---

1. Provide a plurality of optical materials, each having distinct refractive index and dispersion properties.
2. Define a target optical performance for a GRIN lens, which includes desired refractive index profiles and minimized chromatic aberrations.
3. Design an initial spatial distribution for a selected subset of the optical materials across the GRIN lens, wherein each point within the lens can include a combination of two or more materials from the subset, and the total concentration of materials at any point equals 100% before curing.
4. Compute an initial optical error by comparing the refractive index and dispersion characteristics of the initial design to the target optical performance.
5. Apply an error-diffusion algorithm to optimize the material combinations at each voxel within the GRIN lens, wherein the algorithm adjusts the percentage compositions of the selected materials based on the computed optical error and redistributes this error to neighboring voxels to achieve an optimized design.
6. Implement a layer-by-layer printing process for the GRIN lens, where multiple materials are deposited in layers at each voxel and allowed to mix before curing, resulting in a controlled material composition in the z-direction with some loss of resolution;

-continued

Algorithm 2. Fabricating a multi-material GRIN lens.

7. Cure the deposited materials to fix the material composition gradient established by the printing process.
8. Iteratively refine the design through repeated applications of the error diffusion algorithm and adjustments to the printing process until the optical error is minimized and the optical performance of the GRIN lens meets or exceeds the target specifications.

In this example the method permits the selection of fewer materials than the total available for inclusion in the lens, enabling precise control over the refractive index and dispersion characteristics through a physically implemented mixing process, thereby optimizing the lens design for enhanced performance and reduced chromatic aberrations.

Continuing in method 300, at optional step 326, the halftoner receives forecast data corresponding to the device to be fabricated according to the accumulated print maps. Many different forms of forecast data may be useful, the form of the forecast data is not particularly limited. At 328 the halftoner estimates a residual that reveals the level of performance of the device based on the forecast data—viz., the performance of a device manufactured according to the current set of print maps. In one example the modeled index gradients are compared to the prescription and the magnitude of errors, the distribution of errors, the root mean square, peak to value, deviation from shape, or of quantization errors is assessed relative to the prescription or other design intent. The residual errors may be weighted, assessed at one or more wavelengths, and may be generated in the spatial domains, frequency domains, or using wavelet analysis.

In another example, the estimation may include a convergence step that evaluates the manufacturability of the discretized prescription in terms of material placement and printing constraints and assesses whether the discretized prescription can be realized effectively using the available manufacturing processes.

In one, non-limiting example, the residual may comprise a residual between ray-trace data synthesized according to the voxelized 3D print map hereinabove and ray-trace data synthesized according to the prescription received at 314. In such a case, the processed print maps, filtered to accommodate any processing parameters, such as diffusion, by be input to a ray-tracing algorithm, which forecasts the imaging performance of the device, if manufactured according to the current material print map and assumed processing conditions. More specifically, the imaging performance with respect to one or more incident-radiation wavefronts may be forecast. This may include calculating optical performance metrics such as modulation transfer function (MTF), point spread function (PSF), or Strehl ratio for both the original and modeled quantized print-map designs and comparing them.

In other examples the prescription may be reduced to a more compact representation reflecting device performance under conditions of interest.

At 330 the halftoner determines whether the residual exceeds a pre-determined tolerance. If so, then the method advances to 332 where the halftoner adjusts, based on the forecast data received at 326, one or more of the pallet of materials, the set of error-diffusion parameter values, or the set of print-parameter values. In some examples, the adjustment may comprise a gradient-descent, genetic, reinforced-learning, swarm, simulated-annealing, particle-swarm, multi-objective, adaptive, or other deterministic, stochastic, heuristic, machine-learning, or deep-learning optimization. This may include looping through the optimization multiple times until the resulting quality level is reached. In some examples adjustment is responsive to geometric scale, applying different error-diffusion coefficients at different geometric scales to enhance an imaging quality of the device. As noted above such adjustment may be enacted in a closed-loop manner, to minimize the residual between the forecast data and idealized data corresponding to the device. In some examples the residual is computed at two or more wavelengths. Generally speaking, the adjustment may employ any of the optimization techniques described herein. The adjustment may comprise an orthogonal polynomial decomposition, for instance.

The reader will note that method 300 illustrates alternative strategies for optimizing various, adjustable parameter values, as shown by the dot-dashed arrows in FIG. 3. For instance, optimization of the error-diffusion parameter values may be enacted during error diffusion along the current scan path (inner loop in FIG. 3), or, subsequent to a global evaluation of print-map fidelity (any of the outer loops of FIG. 3). These strategies are usable separately or in combination—even during fabrication of a given device. In that spirit, the acts of selecting the material at 320, estimating the error at 322, and compensating the error at 324 may also comprise a gradient-descent, genetic, reinforced-learning, swarm, simulated-annealing, particle-swarm, multi-objective, adaptive, or other deterministic, stochastic, heuristic, machine-learning, or deep-learning optimization.

At 334 each material selected is deposited according to the corresponding print map. As noted above, the set of error-diffusion parameter values received at 318 may include a threshold value. In such examples, for each corresponding print map, material is deposited only to voxels for which the amount of the material exceeds the threshold value.

At 336 each material deposited is solidified. In examples in which the solidified material is based on a thermoset or photoset polymer, solidification may comprise thermal or photochemical curing—e.g., polymerization of a monomer or pre-polymer, and/or crosslinking. In examples in which the solidified material is based on a thermoplastic polymer, solidification may comprise cooling. After fabricating the device, the device may be characterized using the methods described above and the results input to 326.

No aspect of the drawings or description should be understood in a limiting sense, because numerous variations, extensions, and omissions are also envisaged. For instance, in the method as illustrated the image-data receiving and parameter adjustment steps are arranged so as to be usable with simulated data. By moving those steps downstream of solidification step 336, however, the forecast data received at 326 may be real data collected using a fabricated trial device. The real data may be used in the same way as simulated data, to guide the adjustment of the various parameter values.

In some examples the 'array of target voxels' of method 300 may include every deposition site of the manufactured device, but that aspect is by no means necessary. More generally, the array of target voxels may include any, some, or all of the deposition sites. In some examples the array of target voxels may be a first voxel array spanning a first portion of the device. Each print map may also include a plurality of preset values corresponding to a second voxel array spanning a second portion of the device.

In examples in which the prescription is decomposed, at 316, into a set of orthogonal basis function, the scan path for the error-diffusion algorithm may be generated based on any desired metric. Along the generated scan path the error-diffusion algorithm may be applied to the set of basis functions, and used to minimize a cost function. Then a corresponding set of coefficients of the basis functions can be mapped back to the array of target voxels to obtain target values of the dielectric quantity over the array of target voxels. At 322 of method 300, the prescription too may be modified according to the mapping, and the interpolating, decomposing, generating, and mapping may be repeated until the cost function converges to a desired tolerance. The detailed nature of the cost function is not particularly limited. The cost function may comprise a wavefront error, Strehl ratio, side-lobes, gain, MTF, dispersion, or scatter at one or more wavelengths.

Figure 4:
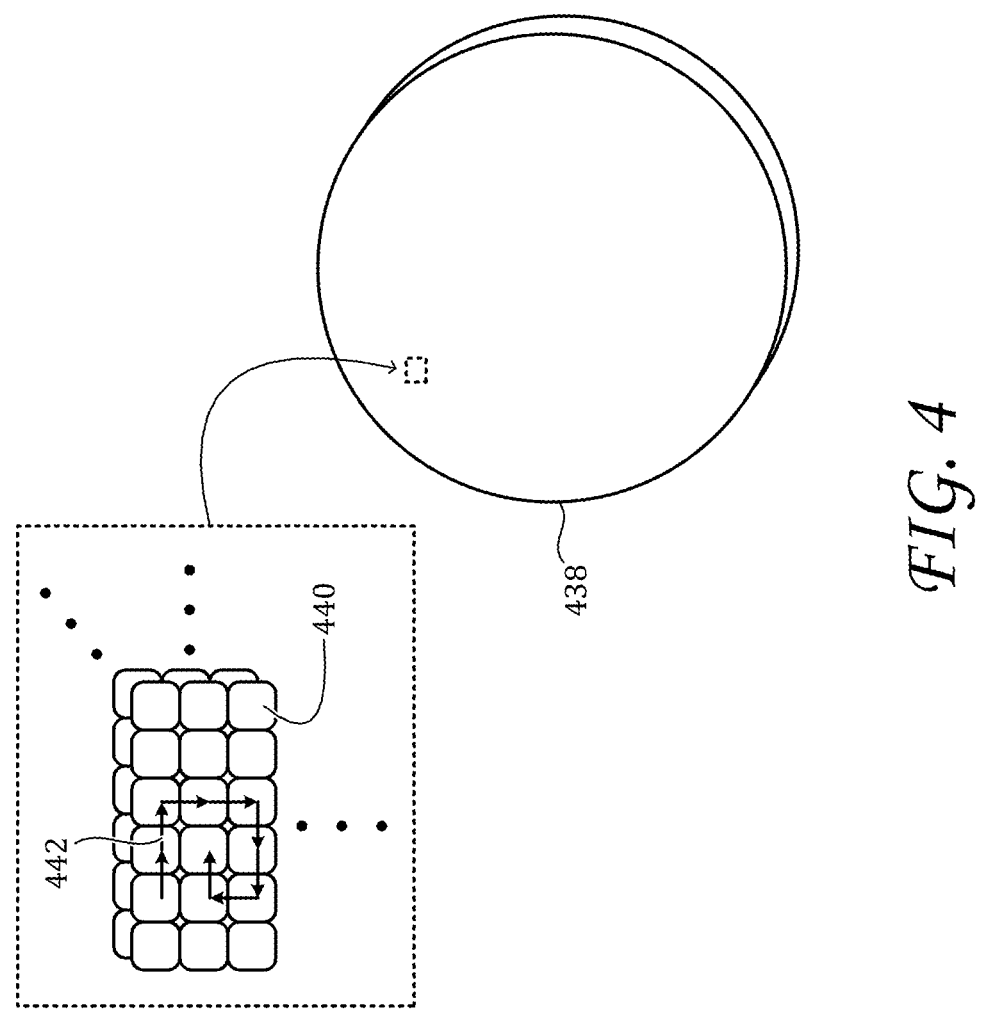
FIG. 4 shows aspects of an example device manufactured according to the method of FIG. 3.

FIG. 4 shows aspects of an example device 438 manufactured according to method 300. The device comprises an array of voxels 440 of solidified material. The array of voxels define at least one scan path 442 along which an error in a variable dielectric quantity at a target voxel is distributed by successive deposition and solidifying of a selected material along the scan path, in accordance with a prescription for the device. In this example the prescription defines the dielectric quantity over the array of voxels.

2

A software tool based on error-diffusion algorithms is described for developing print maps used for fabricating three-dimensional gradient dielectric-property (GDP) optical devices operational in the electro-magnetic (EM) spectrum, including one or more portions of the optical, infrared, and radio-frequency bands, including millimeter-wave and microwave bands. Based on the design characteristics the structure and the architecture, an optimizer topology is defined. The polychromatic optimization tool includes an error-diffusion algorithm that creates a print map for each material used to fabricate the device, based on the material dielectric property spectra or parameterization, and process-related parameters, such as drop volume, diffusion, and placement accuracy. The error-diffusion algorithm determines the location that each material is deposited, so that error is minimized, and performance is optimized, over one or more wavelengths. Analysis of the device performance metrics is used to tailor the error diffusion parameters and to adaptively adjust the threshold, kernel size and shape, kernel coefficients, and scan path of the error diffusion, based on the symmetry, scale, content, and other properties of the device design. Using one or more techniques, including gradient descent, genetic algorithms, reinforced learning, and swarm optimization including deep learning, a print map corresponding to each material is optimized.

GDP optical devices, optimized for operation in the electromagnetic (EM) spectrum, for example, those operational in the visible, infrared, and radio-frequency bands, including the microwave and millimeter-wave, may be fabricated using printable organic, hybrid-organic, and inorganic, glass, ceramic, or composite materials, such that the organization of the materials with respect to their complex dielectric properties, including refractive index, permeability, or permittivity, can alter the shape, amplitude, or phase of the incident waveform. In general, the design of a GDP optic can be described in terms of the dielectric properties of the materials used, including the refractive index, permittivity, and permeability. For example, a gradient refractive-index (GRIN) optic is a type of GDP that has a varying refractive index within its volume, with a distribution that typically varies in the radial direction.

For a rotationally symmetric GRIN optic optimized with a gradient refractive index, the shape and magnitude of the refractive-index profile along the radial direction of the optic is one of the most important configuration freedoms. The description of the profile may include the number and position of interfaces between different refractive-index regions, including transition between refractive-index regions that occur at the sub-wavelength scale.

It can also be a continuous function, such as a parabolic function, a function with high-order aspheric terms, a polynomial, or an exponential function. The thickness and shape of the gradient-index optic can also be altered relative to the gradient-index distributions, and can be controlled to achieve the desired results. The profile can be configured to achieve specific optical functions, such as focusing or collimating light, or may be a phase plate.

An index profile can be described by mathematical functions, which can be implemented or altered by changing the composition of the material or by controlling the fabrication process. Non-axisymmetric and freeform GDP devices, in which there is no axis of symmetry in the dielectric properties of the device, may also be fabricated. A variation in refractive index causes the light wave to alter its phase as it passes through the component, leading to a range of possible optical effects, such as lensing, beam shaping, beam steering, absorption, and image formation.

Using AM, gradient-index optics and other EM devices can be made from a variety of materials, including glass, plastic, nanocomposites, and ceramics. The choice of material affects the optical properties of the gradient-index optic, including the refractive index, dispersion, and absorption. Material selection can also affect the fabrication method and cost.

The fabrication process typically involves techniques such as inkjet printing, chemical vapor deposition, ion exchange, or laser writing, to create the desired refractive-index profile. In the fabrication of a gradient-property device, a plurality of materials are printed concurrently to achieve the desired refractive-index profile. At least two different materials are used. This can be done using 3D printing technologies, such as inkjet printing or direct laser writing. However, printing multiple materials in a precise and controlled manner can be challenging, and can result in non-uniformities and errors in the printed structure.

The error-diffusion algorithm determines the location where each of the concurrently printed materials is deposited, so that errors and non-uniformities in the printed structure are minimized, and an accurate and precise GDP device is achieved. An error-diffusion algorithm creates a binary or multi-material bitmap from a continuous-tone image by diffusing the quantization error from each voxel to its neighboring voxels. A GDP design is converted to a series of print maps, one for each material, for each layer, since the properties of the number of materials printed is fewer than the properties represented in the design. For three-dimensional GDP optics, at least one bitmap is used for each material used in each fabricated layer, such that the design may be represented as a three-dimensional ensemble of voxels.

In U.S. patent application Ser. No. 14/973,340, Williams describes a method of manufacturing a volumetric, continuous-gradient complex dielectric element using drop-on-demand techniques, such as inkjet printing. The method involves calculating the spatial placement of nanocomposite-ink droplets by determining a multi-dimensional gradient profile representing the element and providing a plurality of nanocomposite-inks with at least one having a curable organic-matrix and a concentration of nanoparticles dispersed within. A one-, two-, or three-dimensional print mask is then determined based on the material properties of the nanocomposite-inks and properties of a printing apparatus with a plurality of print heads, and a spatial or spatio-temporal print schedule is computed based on the discretized pattern resulting from the print mask that reproduces the gradient profile when printed with the printing apparatus.

This disclosure differs from the above in that it provides a method of optimizing an error-diffusion algorithm, including polychromatic optimization, using feedback from measured results or results simulated from devices modeled based on material models and process models,to optimize the design of the error-diffusion algorithm. The optimization may include deep-learning methods.

3

A software optimization tool based on error diffusion is described herein, which reduces three-dimensional (3D) gradient dielectric-property (GDP) EM optical devices comprising two or more materials to a set of print maps that can be used to fabricate a device, so that performance is optimized over one or more wavelengths of operation. This disclosure relates to a method for optimizing the fabrication of three-dimensional GDP devices using error diffusion.

A variety of methods may be used to generate a GDP optic (the 'Fabricated Device' herein), which achieves the intended level of performance of the design (the 'Device Design' herein), as defined by one or more metrics. There are a variety of software tools available to design EM devices, including Zemax opticStudio, VirtualLab, Lumerical MODE Solutions, Comsol Multiphysics, Ansys HFSS, CST Studio Suite, and others, that are used to design and simulate EM optical systems.

The error diffusion tool optimizes the placement of each material using bitmaps created using error diffusion. An error-diffusion algorithm works by creating a series of build maps for each of a limited number of materials, which allow for the device to be fabricated using AM, by defining the location that each material is deposited, for a set of manufacturing-process conditions.

The error-diffusion algorithm calculates the difference between the desired dielectric-quantity profile and the dielectric-quantity profile associated with the print map, and distributes the error to adjacent voxels in a way that minimizes the overall error in the printed structure. By iteratively adjusting the Print Profile at each point, the algorithm can gradually reduce the error and improve the performance of the Fabricated Device relative to the intended performance of the Device Design.

Each material used in fabricating a opticGDP optic may be described by its dielectric properties at each wavelength. These properties may include spectrally varying permeability, permittivity, refractive index, or loss. Polychromatic error diffusion can be performed directly, using a tabulated set of values for each wavelength, or can be optimized parametrically, for example by optimizing index, dispersion, and secondary dispersion concurrently. For refractive-index spectra, in addition to index, dispersion, and partial dispersion, the complex wavelength dependence may be parameterized using the Cauchy or Sellmeier equations. These wavelength dependent properties may also be functions of temperature and other external influences such as pressure, and may also be polarization-dependent. Because $n(\lambda)$=sqrt $(\varepsilon(\lambda))$, where n is the index, and $\varepsilon$ is permittivity, parameterized polynomial models can be used to describe permittivity. Similarly, permeability and other properties can be described parametrically as functions of wavelength.

The representations, along with physical properties, such as may be included in a library, may represent a 'Material Model' used by the software to determine the optimal material to be deposited within voxels of the three-dimensional design.

For an optimal bitmap to be obtained for each material, the algorithm has a model of the process (the 'Process Model'), so that the drop volume, the drop distance, the drop diffusion, the drop placement accuracy, and other process-related parameters may be included in the optimization process. These process models also contribute to setting the voxel size.

Optimizing the performance of the three-dimensional GDP optic design at multiple wavelengths concurrently can be challenging, as these properties are often interdependent. To perform error diffusion for a three-dimensional GRIN optic is to manage the interaction between the different wavelengths and materials. This may involve adjusting the error-diffusion parameters for each wavelength and material, and can include techniques such as directional error diffusion, depth-dependent, gradient-rate or optical-power-driven error diffusion, or spatially adaptive error diffusion.

Directional error diffusion takes into account the direction of edges in the image and diffuses the error in a way that preserves these edges. This technique helps to reduce the appearance of jagged edges and produces smoother images. Depth-dependent error diffusion is a technique that takes into account the depth information of the image. This technique assigns different weights to the error diffusion depending on the depth of the voxel within the optic, to minimize error at the surface. Spatially adaptive error diffusion is a technique that adjusts the error diffusion based on the local characteristics of the gradient profile. This technique assigns different weights to the error diffusion depending on the texture and complexity of the local area. optical-power driven error diffusion is a technique that adjusts the error diffusion based on location relative to the optically incident surface and the optical-power and dispersion contributions from the surface and the gradient-dielectric profile. The gradient rate may also be used for optimization.

With known polynomial distribution of the index along all three axes, to optimize the error-diffusion algorithm, one can employ strategies such as adapting the error-diffusion kernel based on local properties of the index profile.

Using the formula for the slope of a power-law index profile, $dn/dr = n_0 k r^{(k-1)}$, where $dn/dr$ is the refractive index gradient, $n_0$ is the refractive index at the center of the optic, k is the power-law index that determines the nature of the index profile, and r is the radial position from the center, the maximum slope at the edge of the optic can be computed, using $dn/dr = n_0 * k * r\_edge^{(k-1)}$.

The gradient of the refractive index (as dictated by k) affects how light rays are bent or focused when they pass through the material. If k>1, the refractive index decreases more steeply with increasing radius. This means that the index is highest at the center and drops off more quickly as one moves outward. If k=1, it leads to a linear decrease in the refractive index with radius. Insight into the slope of the index profile, provided by parameters such as k, when combined with understanding of post deposition physical diffusion of constituents, allows for adaptive implementation of the parameters such as the threshold and error diffusion coefficients.

Using a multi-level approach it is also possible to perform error diffusion on each of the polynomial terms separately, and then combine the resulting bitmaps to create a composite bitmap for the GRIN optic. This approach can be useful when different polynomial terms have different sensitivities to error diffusion, or when different regions of the optic have different requirements for accuracy or resolution.

It may also be possible to integrate the polynomial distribution into the error-weighting function and use a space-filling curve for traversal (e.g., the Hilbert-Peano curve, Morton curve, or Sierpinski curve). In the case of the space-filling curve-based error-diffusion algorithm, instead of using a kernel with specific weights, the algorithm defines a set of rules that dictate how the error is propagated through the 3D volume based on the position along the space-filling curve. As the algorithm traverses the space-filling curve, the error is diffused based on the assigned weights, which are determined by factors such as radial distance and height.

Additionally, implementing a multi-pass error-diffusion strategy, optimizing the traversal order, and/or using feedback from measurements or simulations can further minimize the wavefront error (WFE), by iteratively adjusting the error-diffusion process and refining the error distribution.

One approach for polyspectral optimization is to perform the error-diffusion process separately for each spectral region (wavelength) and material. This involves generating a separate voxel map for each wavelength and material, and then performing error diffusion on each bitmap separately. This approach can be computationally expensive, but may achieve high-quality results.

Another approach is to perform the error-diffusion process concurrently for all wavelengths and for all materials. This involves generating a single voxel map that contains the index profile for all wavelengths and materials, and then performing error diffusion on this bitmap. This approach can be more efficient than performing the error-diffusion process separately for each wavelength and material, but it can be more difficult to achieve high-quality results.

In the context of GDP-optic optimization, one may create a bitmap for each material, where the bitmap specifies the dielectric-quantity distribution of the material across a lens. One approach would be to use error diffusion to optimize the refractive index distribution of each material separately, based on its corresponding Sellmeier equation, at each wavelength of interest. This would involve iterating over the entire wavelength range and optimizing the refractive index distribution for each material independently.

When using error diffusion to construct a lens, each material assigned to a voxel may have, for example, a unique set of Sellmeier coefficients assigned to it. These varying Sellmeier coefficients can be processed by error diffusion, just like any other variable in the optimization process.

Another approach is to use a multi-level (ML) error diffusion technique that iteratively optimizes the design at each wavelength, or optimizes the refractive-index profile, dispersion, and partial dispersion, for each wavelength and material. ML optimization is a process for optimizing complex systems, such as GDP devices, by dividing the design into smaller parts and optimizing each part separately. The process involves defining the desired optical performance of the system, dividing it into smaller parts corresponding to specific materials and wavelengths, optimizing each part separately, to achieve the desired refractive-index and dispersion properties, combining the optimized parts to create a final composite index profile and dispersion, and verifying and refining the design to ensure that it meets the desired performance criteria. This may allow for higher levels of performance and complexity than would be possible with a single, monolithic optimization process.

In this approach, the error-diffusion process is performed for each wavelength and material separately, and the resulting bitmap is used to calculate the dielectric-quantity profile, dispersion, and partial dispersion for that wavelength and material. The index profile and dispersion are then used to generate a new bitmap, which is fed back into the error-diffusion process to further refine the refractive-index profile and dispersion. This process is repeated until the desired level of optimization is achieved.

The output of a multi-level error diffusion for a three-dimensional GRIN optic composed of two or more different materials, each characterized by its spectral dielectric properties such as index and dispersion, results in a bitmap that describes the deposition of each material for each layer of the device.

Another approach would be to use a global optimization algorithm that can optimize the refractive index distribution of all materials concurrently, based on their respective dispersion values, partial dispersion values, or the Sellmeier equations, across the entire wavelength range of interest. To determine the threshold, kernel size, kernel shape, and scan path that minimize the error between the intended design and the fabricated device, the method utilizes an optimization algorithm. This would allow for more efficient optimization but may involve a more complex optimization algorithm and may be more computationally expensive.

Another approach is to perform error diffusion on the Zernike representations of the GDP optical design. Zernike polynomials may be used for multi-level optimization. In the context of GDP device, a voxel can be thought of as a small region within the overall design, where the index varies smoothly. The index profile within that voxel can be approximated by a Zernike expansion, with the coefficients representing the local variations in the index profile. Each voxel can have its own set of Zernike coefficients, which can be optimized independently to achieve the desired index profile and dispersion within that region.

By optimizing the Zernike coefficients independently for each voxel, one can achieve more detailed and fine-grained control over the refractive-index profile of the GRIN optic. This approach allows the refractive-index profile to be tailored to the specific requirements of each region within the design, which can lead to better overall performance. To develop a single bitmap for each deposited material, the optimization process is performed iteratively until convergence is achieved. During each iteration, the Zernike coefficients for each voxel are adjusted to improve the refractive-index profile and reduce the error between the target and actual index profile.

As the optimization progresses, the Zernike coefficients for each voxel will gradually converge to a final set of values that provide the desired refractive-index profile for that region. Once the optimization is complete, a final bitmap can be generated for each wavelength by applying a threshold to the optimized Zernike coefficients for each voxel.

One approach that may be implemented is to use a 3D space-filling curve like the Hilbert-Peano curve, Morton curve (Z-order curve), or Sierpinski curve. To create a 3D space-filling curve, one may follow a set of recursive rules that define the curve at different scales. It is important to note that the space-filling curve fills a grid, and that the error-diffusion kernel will be adjusted accordingly. In this case, the error-diffusion kernel is not a fixed matrix but rather a set of rules that dictate how the error is propagated through the 3D volume. As one traverses the space-filling curve, one would diffuse the error based on the weight associated with the position in the curve. One approach is to assign weights based on the distance between points in the curve. This will create a smooth error diffusion, effectively distributing the error throughout the volume. It is then possible to iterate through the 3D space-filling curve and, for each point (x, y, z), diffusing the error based on the weight associated with the position in the curve. This will create a smooth error diffusion, effectively distributing the error throughout the volume.

In the case of a rotationally symmetric GRIN optic, it is possible to consider an error-diffusion algorithm that takes into account the radial distance and the height from the front surface of the lens. To achieve this, it is possible to use the rules of Algorithm 3.

---

Algorithm 3. Error-diffusion algorithm construction.

---

1. At each voxel, calculate the radial distance (r) from the optical axis and the height (z) from the front surface. Use these values to determine the aspheric terms for the current voxel (r^2, r^4, r^6, etc.).
2. Assign weights to the error distribution based on the radial distance and height. Higher weights should be given to voxels farther from the optical axis and closer to the back surface, while lower weights should be given to voxels near the optical axis and the front surface. This can be done by using a weighting function that combines the radial distance and height values.
3. Distribute the error to neighboring voxels along the space-filling curve based on the assigned weights. This way, the error is pushed away from the central region with the highest optical power and towards the regions with less optical power near the back edges.

---

By following these rules, it is possible to create an error-diffusion algorithm tailored to the specific requirements of a rotationally symmetric GDP optic. For a radial device, it will allow for the error to be distributed effectively away from the high optical-power regions and towards the lower optical-power regions, near the back edges.

In the optimization process, the generated bitmaps ('Print Maps' herein) for each material, may be used to fabricate a device (Fabricated Device) or may be used with Material Models, to simulate a device ('Pseudo Device' herein), such that an 'Error Map' may be generated, analyzed, and used via feedback, to optimize the parameters of the error diffusion model, including thresholds, kernel size, kernel coefficients, and/or scan paths.

For a given Process Model and available material parameters (i.e., Material Model) the three-dimensional set of bitmaps may be used to create a Pseudo Device. The performance of the Pseudo Device may be modeled and its performance simulated, for example by using ray-tracing software, or similar. The simulated performance of the Pseudo Device may be compared to the original prescription. The difference between the metrics used in the simulated performance and the value of the metrics of the Device Design may be defined as the 'Simulated Error Map'. If the error associated with a defined metric, such as WFE or difference between the intended Strehl ratio, MTF, or distortion and the measured values exceeds a threshold, then optimization of the 'Error Diffusion Module', would continue.

When appropriate, errors such as WFE may be analyzed using methods such as Zernike decomposition. The Zernike polynomial description of the WFE for each wavelength may be used as feedback to adjust the bitmaps. One approach is to use the Zernike polynomials to calculate the optimal correction function for each wavelength. This function can be used to correct the WFE in a GRIN optic by adjusting the refractive-index profile or other aspects of the design.

To update the bitmaps, one may use the Zernike polynomials to calculate the new voxel values based on the desired correction function. This can be done using a variety of methods, such as Fourier analysis, wavefront-propagation techniques, or other numerical methods. The Zernike coefficients may also be used to determine the gradient of the error with respect to the bitmap and may be used to correct the bitmaps in the direction of the negative gradients using a gradient-descent algorithm.

One way to determine the gradient of the error is to calculate the first-order derivatives of the Zernike polynomials. The first-order derivatives provide information about the slope or gradient of the error at each point in the GRIN optic. To calculate the first-order derivatives of the Zernike polynomials, it is possible to use numerical-differentiation techniques. For example, the forward difference method or the central difference method can be used to estimate the slope of the Zernike polynomials at each point in the GRIN optic. Once the gradient of the error has been determined, it can be used to design and implement error-correction or compensation techniques. For example, the gradient can be used to calculate the optimal correction function for each wavelength, which can be used to adjust the refractive-index profile or other aspects of the design.

After optimizing the design to the suitable level of Simulated Error, the devices can be fabricated and the errors measured. The measured errors may be used to iterate the optimization of the device and may also be used to optimize the Process Model.

It may be possible to develop rules or heuristics that can guide the optimization process based on known properties of the GRIN design. For example, if the GRIN profile is highly symmetric, certain error-diffusion algorithms may be more effective than others. Similarly, if the gradient rate is high, then certain algorithms may be more effective at minimizing wavefront error. These rules could be built into an automated optimization algorithm to help guide the selection of the optimal error-diffusion algorithm.

Determining the optimal error-diffusion algorithm for a specific gradient index optic design may involve experimentation and evaluation of different algorithms. Some factors that can affect the choice of algorithm include the complexity of the gradient-index profile, the desired accuracy of the final optic, and the limitations of the fabrication process.

Optimization techniques such as gradient descent, genetic algorithms, or simulated annealing can be used to adjust the thresholds, kernel size, kernel coefficients, and scan path. Gradient descent involves iteratively adjusting the parameters in the error-diffusion algorithm to minimize the wavefront error. Genetic algorithms involve generating a population of possible parameter sets, evaluating their performance, and selecting the best performers to 'breed' and generate the next population. Simulated annealing involves randomly adjusting the parameters and accepting or rejecting the changes based on their impact on the wavefront error, with the acceptance probability decreasing over time.

Stochastic methods can be used in optimization and modeling applications to introduce randomness and explore a wider range of possibilities, potentially leading to better solutions.

Deep learning can be applied in several ways for optimizing error-diffusion algorithms for GRIN optics. One approach is to use deep neural networks to learn the mapping between the input bitmaps and the output wavefront error.

The neural network can be trained on a large dataset of input bitmaps and their corresponding output wavefront errors, to learn the complex nonlinear relationships between the two. Once the neural network is trained, it can be used to predict the output WFE for any new input bitmap.

Another approach is to use deep-reinforcement learning to optimize the error-diffusion algorithm. In this approach, the error-diffusion algorithm is treated as an agent that takes actions (such as selecting the threshold and the kernel size) based on the current state of the system (the input bitmap). The reinforcement learning algorithm learns the optimal policy for the agent by maximizing a reward function (such as minimizing the wavefront error). This approach has the advantage of being able to adapt to different types of input bitmaps and can potentially find better solutions than other optimization techniques.

It may be possible to automate the optimization process by training a deep learning system to recognize patterns in the high-order polynomial functions or GRIN profiles and determine the optimal error-diffusion algorithm. This would involve a large dataset of simulated or measured data, as well as a carefully designed network architecture that is capable of accurately predicting the optimal algorithm for a given set of parameters.

One approach is to use a neural network to learn the relationship between the GRIN index distribution and the resulting WFE, and use this network to optimize the error-diffusion algorithm. This can be done using a combination of supervised and reinforcement learning methods. Another approach is to use a generative adversarial network (GAN) to generate the bitmaps directly and use a separate neural network to evaluate the resulting wavefront error. The GAN can then be trained to generate bitmaps that minimize the wavefront error.

One embodiment of this disclosure is to incorporate custom error-diffusion algorithms into the optical-design software workflow. The first step in this process is to develop and optimize the error-diffusion algorithm. Once the algorithm is validated and optimized, it can be integrated into the optical-design software package. The software package can then be used to design the desired gradient-index optic, taking into consideration the error-diffusion algorithm and other relevant parameters.

During the design process, the software package can simulate the printing process and the resulting refractive-index profile using the integrated error-diffusion algorithm. This enables the designer to evaluate the performance of the designed gradient-index optic, including its wavefront error, before it is fabricated. Any adjustments to the design or error-diffusion algorithm can be made in real-time within the software package.

By integrating the error-diffusion algorithm directly into the optical design process, the overall design workflow can be streamlined and more efficient. This can ultimately lead to more accurate and precise gradient-index optics, with reduced design and fabrication time.

An optimizer may be built directly into the design software, so that the GDP device design is optimized for fabrication.

4

Figure 5:
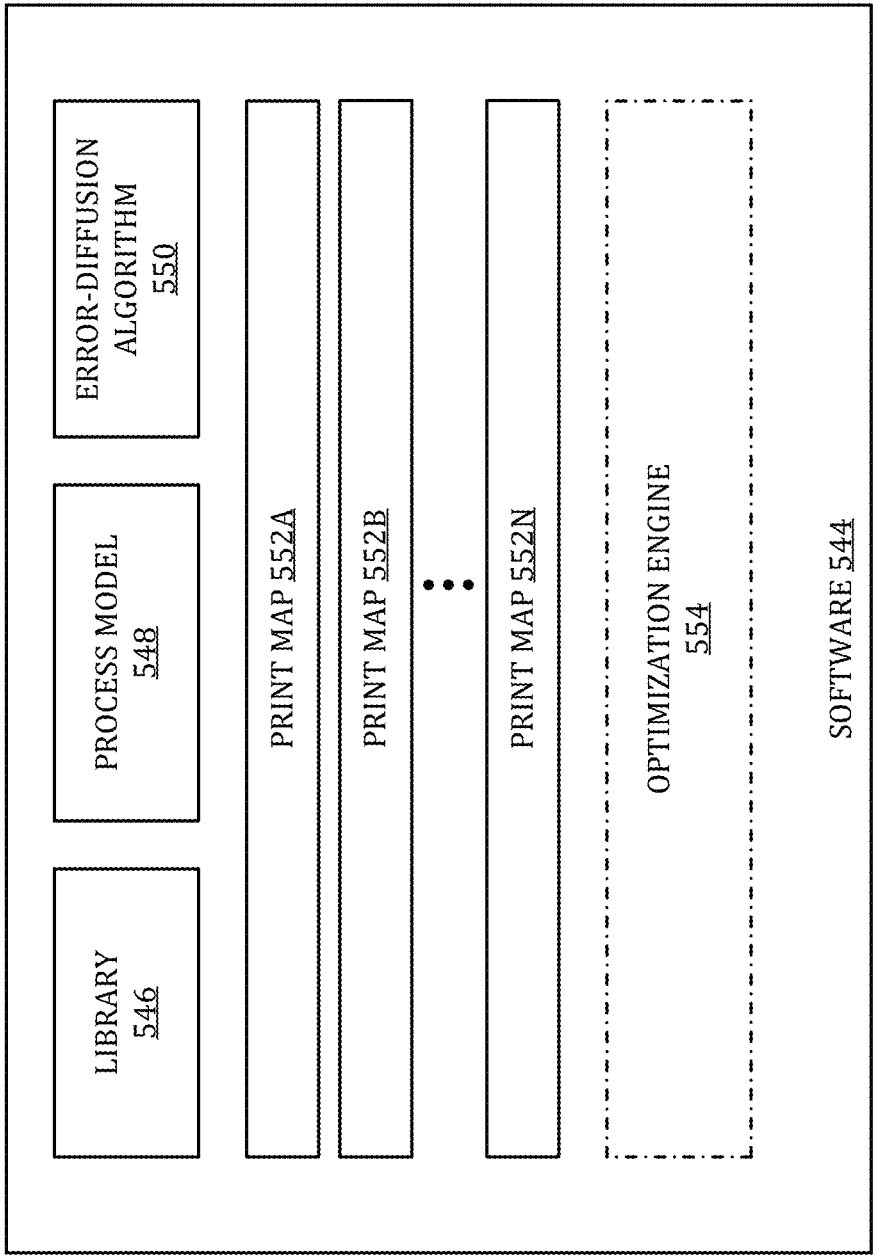
FIG. 5 shows aspects of example halftoning software for developing print maps for fabricating a device.

FIG. 5 shows aspects of example halftoner software 544 for developing the print maps used to fabricate a device which is graded or inhomogeneous in one or more dielectric continuous properties. As noted herein, the nature of the manufactured device is not particularly limited. The device may be a gradient refractive index (GRIN) device operational in the optical or RF wavelength regions, or a plano-convex optic with a radial gradient index, for instance. More generally, the dielectric quantity may be one or more of a refractive index, a Zernike coefficient, a Fourier coefficient, or a wavelet coefficient. The error-diffusion algorithm is enacted on a distribution of the dielectric quantity, or on a multi-scale distribution of the device design. In these and other examples, the halftoner software takes into consideration the material properties and the print process for manufacturing a device.

Halftoner software 544 comprises a library 546 of EM feedstock, each described by one or more dielectric property spectra. In some examples the library of optical feedstock is a database of complex dielectric spectra (refractive index, etc.) for two or more materials used to construct the device, which tabulates the spectral properties of one or more dielectric properties or presents the materials using index, dispersion, and partial dispersion, parameters, or uses parameterized polynomial representations, such as a Sellmeier or Cauchy representation. Thus, the error-diffusion model may include a multi-spectral model of the materials used to fabricate the device. Generally speaking, the halftoner software optimizes the value distribution within the device structure.

Halftoner software 544 comprises a process model 548 that is described by parameters such as the drop size, deposition resolution, inter-diffusion, drop accuracy, and other process parameters.

Halftoner software 544 comprises an error-diffusion algorithm 550 that reduces the gradient-dielectric properties to a set of bitmaps for each material used in the construction of the devices. The halftoner software stores and applies certain parameters including: a threshold value for determining which refractive index values are to be diffused, a kernel size and kernel shape for determining the distribution of the diffused dielectric index values, kernel coefficients for weighting the diffused dielectric index values, and a scan path for determining the order in which dielectric index values are diffused within the gradient-dielectric device. The error-diffusion algorithm determines the optimal threshold value, kernel size and shape, kernel coefficients, and scan path based on the dielectric-index distribution of the device and the material properties used in the additive manufacture. In some examples the threshold, kernel matrix size, kernel coefficients, and scan direction are adjusted based on local image characteristics. In some examples one or more of the parameters of the error-diffusion model is adaptive based on the content of the device design. In some examples the error-diffusion algorithm is weighted based on the properties of the device design. In some examples the error-diffusion algorithm employs a multi-scale approach that applies error diffusion with different diffusion coefficients at different scales to enhance the accuracy and quality of the output image. In some examples the error-diffusion algorithm includes a spatially adaptive, multi-scale, depth-dependent, power-dependent, content-aware, or fractal-diffusion algorithm.

In the illustrated example optimized print maps 552 (e.g., bitmaps) are used for fabricating the device. The optimized print maps are depth-dependent, based on the location relative to the optically incident surface, optical power, or dispersion. The optimized print maps are determined as part of the design process to ensure that the optimal algorithm coefficients and kernels are used for the particular optical feedstock and print manufacturing processes.

In the illustrated example, halftoner software 544 includes an optional feedback engine 554. The feedback engine uses the measured error from a fabricated or simulated device to update the parameters of the error-diffusion algorithm, including one or more of the threshold values, the kernel size, the kernel coefficients, or the scan path over all or a portion of the device. In some examples a Zernike decomposition is used to inform the optimization process. In some examples the optimization is performed using a gradient-descent, genetic, reinforced-learning, swarm, simulated-annealing, particle-swarm, and/or other deterministic, stochastic, heuristic, machine-learning, or deep-learning method. In some examples the feedback engine optimizes the algorithm for operation over at least two wavelengths or colors.

In some examples halftoner software 544 may execute any, some, or all of the algorithms herein.

---

Algorithm 4. Optimizing the performance of a gradient-property device comprised of two or more materials.

1. Design a gradient-dielectric index device.
2. Apply an error-diffusion algorithm to a gradient device design, to generate a bitmap for each material used to fabricate the gradient device, wherein the error-diffusion algorithm includes threshold settings, kernel size and shape, kernel coefficients.
3. Use a Material Model, a Process Model, and the print maps obtained from the error diffusion, to simulate the performance of a pseudo-optic based on the optical properties of the materials and a process model, such as drop size, drop volume, drop accuracy, diffusion, and drop distance from other drops.
4. Compute the error of the pseudo-optic compared to the original design using one or more performance metrics, including wavefront error, Strehl ratio, side-lobes, gain, MTF, dispersion, or scatter at one or more wavelengths
5. If the error is above a predetermined threshold, optimizing the parameters of the error-diffusion algorithm, including the threshold, the kernel size, the kernel coefficients, and the scan path, based on the simulated error of the pseudo-optic compared to the original design; and return to step c,
6. Fabricate the gradient-index optic based on the generated bitmaps for each material;
7. Measure the error of the fabricated gradient-dielectric part; and
8. If the error is not below a predetermined threshold, updating the process model based on the measured error or calibrate the process to the level of the model, and return to step 3.

---

Algorithm 5. Optimizing an error-diffusion algorithm for a gradient-dielectric property device made of two or more materials.

1. Select a kernel for the error-diffusion algorithm based on the specific requirements of the application and the characteristics of the input gradient-property design.
2. Optimize the coefficients of the diffusion kernel based on the characteristics of the input image, including its contrast, local frequency content, symmetry, gradient slope, texture, or spatial energy, in local regions or globally throughout the device.
3. Select a scan path for the error-diffusion algorithm based on the specific requirements of the application and the characteristics of the input gradient-property design.
4. Apply one or more of a multi-scale-diffusion algorithm, depth-dependent error diffusion, dispersion-dependent error diffusion, optical-power dependent error diffusion, spatially adaptive error diffusion, Zernike decomposition, or fractal error diffusion approach to the error-diffusion algorithm to enhance the accuracy and quality of the output bitmaps used to fabricate the device.

---

5

Figure 6:
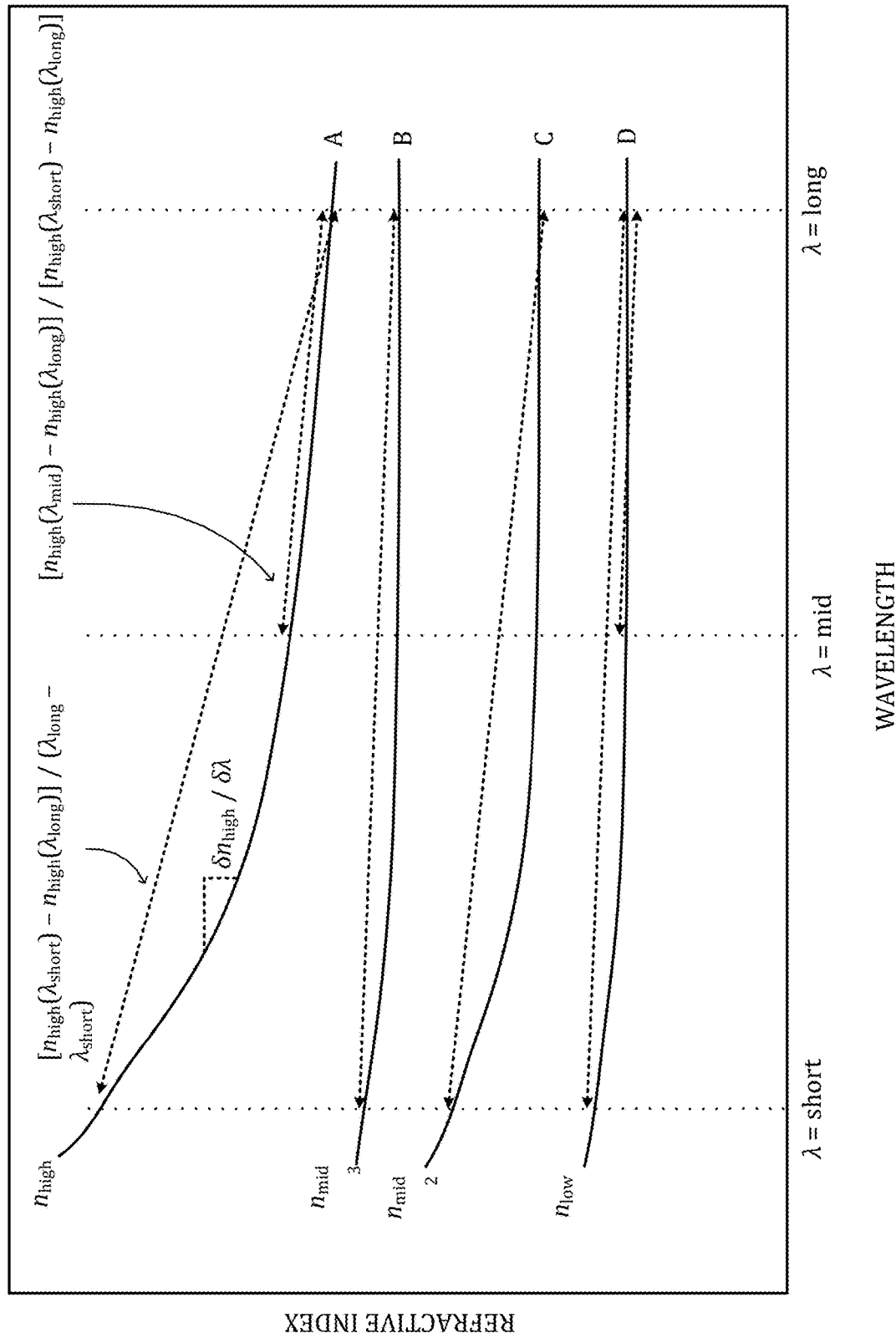
FIG. 6 is a plot of refractive-index spectra for four different prophetic materials.

FIG. 6 is an plot of a spectral dielectric property of four prophetic materials. In this case, the curves may represent refractive-index curves for four materials. To fabricate a continuous-gradient device, at minimum two materials are used that can then be print composed at sub-wavelength resolutions, to avoid scattering, by mixing different concentrations of a high- and a low-index material. The spectral index curves have values that vary as functions of wavelength. The local slopes of the spectral index curves are given by $\delta n/\delta \lambda$. The curves may be modeled using parameterized equations such as the Cauchy or Sellmeier equations. Also shown in the plot is the first-order parameterization of the spectral dispersion, $[n\ (\lambda_{short})-n\ (\lambda_{long})]/(\lambda_{short}-\lambda_{long})$, which describes the index change over the waveband of consideration. The partial dispersion describes the portion of the dispersion that happens over different portions of the spectral band. Shown in FIG. 6. is the partial dispersion attributable to the longer wavelength portion of the waveband.

Figure 7:
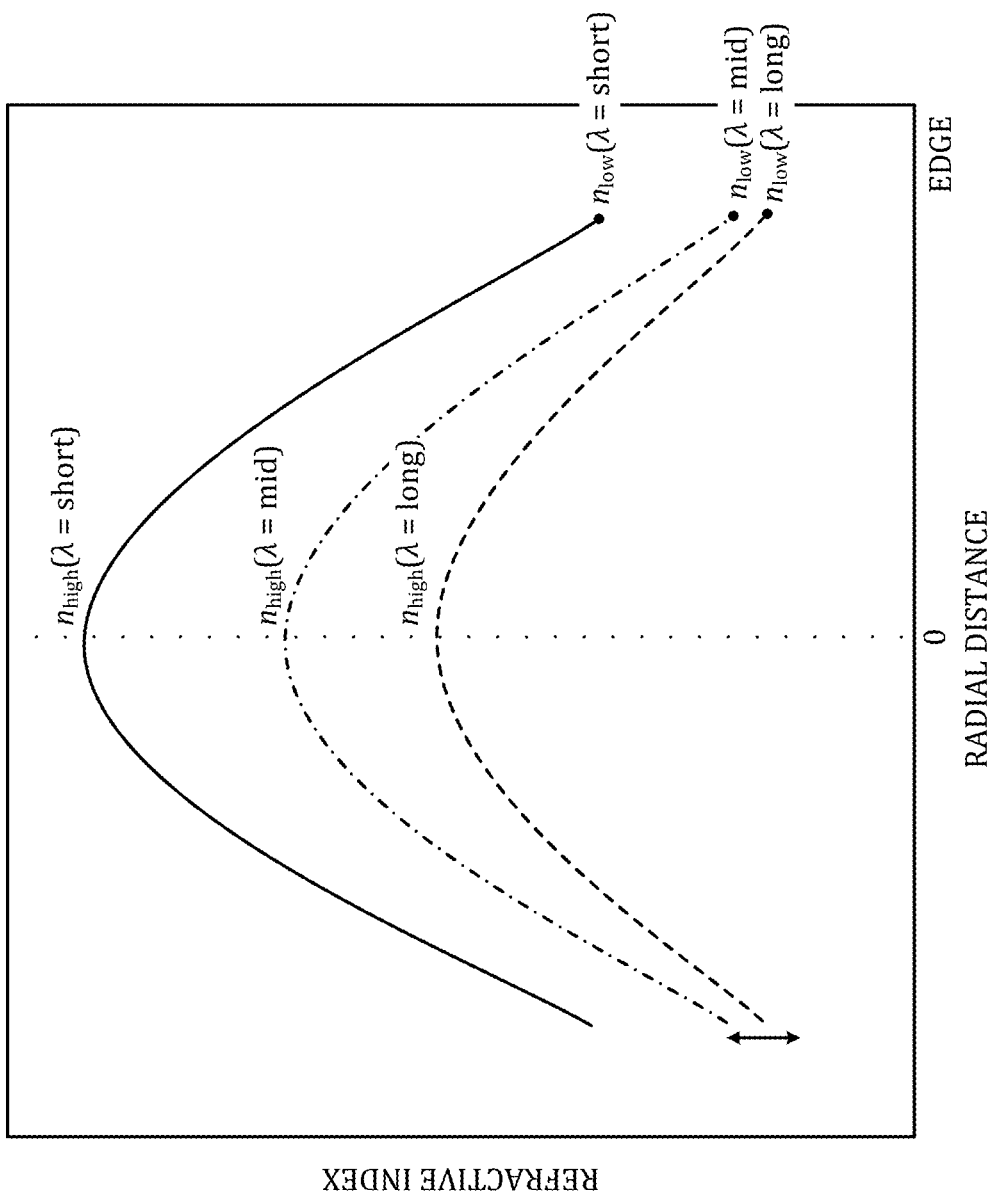
FIG. 7 is a plot of refractive index versus radial distance for a prophetic, radially symmetric device.

FIG. 7 is a plot of refractive index versus radial distance for a prophetic, radially symmetric graded-dielectric device design, wherein the index value is high at the center and has a gradient that descends to a low value at the edges. Most designs are expressed monochromatically, using the average or middle index value. However, as shown in the drawing, due to the spectrally varying index values, the index distributions are different at higher and lower wavelengths. The optical function has a distribution that depends on wavelength. The radial distributions that define the optical functions for a radially symmetric design may be described at three wavelengths as follows:

$$n_{\lambda short}(x, y, z) =$$
$$n_{\lambda short}0 + \Delta n_{\lambda short}(r_2 r^2 + r_4 r^4 + r_6 r^6 + z_1 z + z_2 z^2 + r_2 z_1 r^2 z + r_2 z_2 r^2 z^2 \ldots)$$

$$n_{\lambda mid}(x, y, z) =$$
$$n_{\lambda mid}0 + \Delta n_{\lambda mid}(r_2 r^2 + r_4 r^4 + r_6 r^6 + z_1 z + z_2 z^2 + r_2 z_1 r^2 z + r_2 z_2 r^2 z^2 \ldots)$$

$$n_{\lambda long}(x, y, z) =$$
$$n_{\lambda long}0 + \Delta n_{\lambda long}(r_2 r^2 + r_4 r^4 + r_6 r^6 + z_1 z + z_2 z^2 + r_2 z_1 r^2 z + r_2 z_2 r^2 z^2 \ldots).$$

Algorithm 6 describes a method for optimizing error-diffusion kernels for making gradient-index optics involves designing a GDP optic using optical-design software and converting the design into a three-dimensional set of bitmaps using an error-diffusion algorithm.

---

Algorithm 6. Optimizing error-diffusion kernels

1. Design the GDP optic using optical-design software (Device Design).
2. Convert the design to a three-dimensional set of bitmaps, one for each material, using an error-diffusion algorithm that is optimized for the print process and properties of the materials available for use.
3. Either fabricate or simulate the device and measure performance of selected metrics, such as wavefront error, Strehl ratio, sidelobe size, gain, directionality, modulation transfer function (MTF), transmission, reflection, and scattering.
4. Characterize the error between the intended performance and the measured performance.
5. If the error is above a set threshold, use the measured error to update the parameters of the error-diffusion algorithm, including one or more the threshold, the kernel size and shape, the kernel coefficients, or the scan path
6. Repeat the steps 2 through 5 until the error is below the specified level.

---

Based on the GDP optic design, the error-diffusion algorithm may be optimized with threshold levels, kernel size and shape, kernel coefficient values, and scan path. Kernel designs may include multi-scale, adaptive, fractal, depth-dependent, gradient, rate-dependent, distance-dependent, content-aware, and radially symmetric designs. The kernels may be implemented using a random scan path, a 3D space-filling trajectory, a spiral-scan, or other scan paths.

After optimization, the bitmaps, one for each material, for each layer, may be used to construct a device that can be tested to determine performance against a set of metrics. Alternatively, a Pseudo-Device can be modeled using the Material Model and the Process Model, and the performance may be simulated using the original design software or other modeling software. The measured or simulated performance, including metrics such as wavefront error, Strehl ratio, sidelobe size, gain, directionality, modulation transfer function (MTF), transmission, reflection, and scattering, may be compared to the original design. The error between the Device Design and Pseudo-Device Design is measured, and if it is above the threshold, the parameters of the error-diffusion algorithm are optimized, preferably based on the properties of the errors. The process is then repeated until the error is below the specified level. The error may be analyzed using Zernike decomposition, frequency analysis, or other types of analysis, providing feedback for updating the algorithm. In addition to the above kernel designs, other designs may also be used, including combinations of different designs, and new designs may be developed as needed to meet specific requirements for a particular application.

Algorithm 7 describes a method of fabricating a GDP optic.

---

Algorithm 7. Fabricating a GDP optic.

1. Design the GDP optic using optical-design software (Device Design).
2. Convert the design into a three-dimensional set of bitmaps using an error-diffusion algorithm optimized for the printing process and materials being used.
3. Use the Material Models and Process Models to derive the properties of a Pseudo-Device Design fabricated using the bitmaps for each layer.
4. Characterize the performance of the Pseudo-Device Design using performance characteristics such as wavefront error, Strehl ratio, modulation transfer function (MTF), transmission, and scattering.
5. Characterize the error between the Device Design and the Pseudo-Device Design.
6. If the Error is above the threshold, use the measured error to update the parameters of the error-diffusion algorithm, including one or more of the threshold, the kernel, the kernel coefficients, or the scan path.
7. Repeat the steps 2 through 6 until the error is below the specified level.
8. Prepare the printing process by calibrating the printer for the printing parameters identified by the error-diffusion optimization.
9. Print the heterogeneous-property device using a printer with multiple feedstock.
10. If necessary, perform post-printing processing steps such as curing, polishing, or coating.
11. Inspect the printed gradient-index optic and test the gradient-index optic for performance characteristics such as point spread function (PSF), wavefront error (WFE), Strehl ratio, modulation transfer function (MTF), transmission, and scattering.
12. Repeat steps 7 though 11 as necessary, adjusting the process parameters based on the measured results.
13. Repeat steps 3 though 12 as necessary, adjusting the Process Models or Material Models based on the measured results.

---

The method of Algorithm 7 involves a method of designing gradient-index optics using optical-design software and converting the design into a three-dimensional set of bitmaps using an error-diffusion algorithm. The error-diffusion algorithms may be optimized with a threshold levels, kernel size and shape, kernel coefficient values, and scan path. The optimization may also include the selection of kernel designs from those that include multi-scale, adaptive, fractal, depth-dependent, gradient, rate-dependent, distance-dependent, content-aware, and radially symmetric designs. The kernels may be implemented using a random scan path, a 3D space-filling trajectory, a spiral scan, or other scan paths. The optimization may also include awareness of the content of the design, which may be used to develop multi-scale, segmented, or content-aware approaches to optimizing error diffusion. Additionally, optimization may be done for multiple wavelengths, based on the spectral dielectric properties of the materials.

The output of the error diffusion are print maps for each material used to construct the device. The print maps include bitmaps for each layer, or slice, used to construct the device. The bitmaps for each layer are used, along with the Material Models and the Process Model, to model a Pseudo-Device Design, which may be simulated to determine performance. Simulation may be performed using the original optical-design software or another ray-tracing or wavefront-analysis tool, that measures various parameters such as wavefront error, Strehl ratio, modulation transfer function (MTF), sidelobe size, gain, reflection, transmission, and scattering, and the optimization of the bitmaps may be integrated into the GDP optic design directly.

The error between the Device Design and Pseudo-Device Design is simulated, and if it is above a pre-determined tolerance, the parameters of the error-diffusion algorithm are updated and the process is repeated until the error is below the pre-determined tolerance. Based on analysis of the error, which can include Fourier analysis, wavelet analysis, Zernike analysis, or other, an optimization module identifies the updates to the parameters of the error-diffusion algorithm, and the process is repeated until the error is below a predetermined level. The topology of the optimizer may be defined using various methods, including gradient-descent or genetic algorithms, swarm optimization, assisted learning, deep learning, or other machine-learning methods. These methods can enable the optimizer to efficiently search for the optimal parameters of the error-diffusion algorithm, taking into account various constraints and feedback mechanisms.

The process can then be repeated until the error is below a predetermined level.

The printer is calibrated for the printing parameters provided to, or selected by the error-diffusion optimization, and the device is printed using a printer with multiple feedstock. Post-print processing steps such as curing, polishing, or coating may be performed if necessary. The printed gradient-index optic is inspected and tested for performance characteristics such as point spread function (PSF), WFE, Strehl ratio, modulation transfer function (MTF), transmission, and scattering.

The process can be repeated, adjusting the error-diffusion algorithm parameters or Material Models or Process Models based on the test results.

---

Algorithm 8. Optimization Topology.

1. Define an objective function that calculates the performance metrics of the error-diffusion algorithms. This can be done using a ray-tracing algorithm or other optical-design package to simulate the performance of the gradient-index optic for a given set of input parameters.
2. Connect the optimization method (stochastic optimization or genetic algorithm) to the objective function so that it can be optimized using the performance metrics.
3. Iterate the optimization method until the performance metrics converge to a minimum or until a stopping criterion is met.
4. Validate the optimized error-diffusion algorithms by testing them on actual devices or simulations, and comparing their performance to that

---

Algorithm 8. Optimization Topology.

predicted by the optimization method integrated with the ray-tracing algorithm or optical-design package.

---

Algorithm 9. Stochastic optimization.

1. Select an appropriate stochastic optimizer such as stochastic gradient-descent (SGD), Adam, or RMSProp. These optimizers update the input parameters of the model based on the gradient of the loss function with respect to those parameters.
2. Initialize the input parameters of the model with suitable values. This can be done randomly or using domain knowledge.
3. Compute the value of the loss function for the current set of input parameters. This provides a measure of how well the model is currently performing.
4. Compute the gradient of the loss function with respect to the input parameters. This indicates the direction in which the parameters are to be adjusted in order to improve performance.
5. Update the input parameters of the model using the chosen stochastic optimizer. The optimizer adjusts the parameters in the direction of the gradient to minimize the loss function.
6. Repeat steps 3 to 5 until the loss function converges to a minimum or until a stopping criterion is met.
7. Validate the optimized error-diffusion algorithms by testing them on actual devices or simulations, and comparing their performance to that predicted by the stochastic optimizer.

---

Algorithm 10. Genetic optimization.

1. Define a way to represent the solutions as a set of genes, such as a vector of input parameters. This genetic representation should allow for efficient manipulation of the solutions.
2. Generate an initial population of solutions randomly or using domain knowledge.
3. Evaluate the fitness of each solution in the population using a fitness function that measures the performance of the error-diffusion algorithm. This fitness function should provide a measure of how well the solution performs.
4. Select the fittest solutions from the population to use as parents for the next generation. This can be done using a variety of selection methods, such as tournament selection or roulette-wheel selection.
5. Combine the genes of the selected parents to create new offspring solutions. This is done by randomly selecting genes from each parent and combining them to form a new solution.
6. Introduce random changes to the offspring solutions to increase diversity and explore new areas of the solution space.
7. Replace the least fit solutions in the current population with the new offspring solutions.
8. Repeat steps 3 to 7 until the population converges to a set of optimal solutions or until a stopping criterion is met.
9. Validate the optimized error-diffusion algorithms by testing them on actual devices or simulations, and comparing their performance to that predicted by the genetic algorithm.

---

Algorithm 11. Deep-learning optimization.

1. Collect simulated or measured data that contains the performance of error-diffusion algorithms for different sets of input parameters.
2. Preprocess the collected data to ensure it is in a suitable format for training a deep-learning model.
3. Select an appropriate deep-learning model such as a CNN, RNN, or fully connected neural network that can effectively learn the relationship between the input parameters and the performance metrics.
4. Train the selected model using the preprocessed data and guide the training process using the performance metrics.
5. Evaluate the performance of the trained model on a separate test set to ensure it can effectively generalize to new data.
6. Use the trained deep-learning model to optimize the error-diffusion algorithms by selecting the input parameters that result in the best performance metrics.
7. Validate the optimized error-diffusion algorithms by testing them on actual devices or simulations, and comparing their performance to that predicted by the deep-learning model.

---

This approach can help to automate the optimization process and improve the performance of gradient-index optics.

---

Algorithm 12. Deep-learning integrated with ray tracing.

1. Define an objective function that calculates the performance metrics of the error-diffusion algorithms. This can be done using a ray-tracing algorithm or other optical-design package to simulate the performance of the gradient-index optic for a given set of input parameters.
2. Train a deep-learning model using the simulation data generated by the ray-tracing algorithm or optical-design package. The deep-learning model can learn the relationship between the input parameters and the performance metrics of the error-diffusion algorithms.
3. Use the trained deep-learning model as the objective function for the optimization method. The optimization method can then find the set of input parameters that result in the best performance metrics, by querying the deep-learning model for the predicted performance metrics for a given set of input parameters.
4. Iterate the optimization method until the performance metrics converge to a minimum or until a stopping criterion is met.
5. Validate the optimized error-diffusion algorithms by testing them on actual devices or simulations, and comparing their performance to that predicted by the deep-learning model integrated with the ray-tracing algorithm or optical-design package.

---

Algorithm 13. Optimizing the error-diffusion algorithm for a gradient property device made of two or more materials.

1. Determine an optimization topology such as sequential, parallel, hierarchical, cooperative, or hybrid.
2. Define an objective function of what the optimizer is trying to optimize. It could be a single objective or a combination of multiple objectives.
3. Identify design variables that are the parameters that the optimizer can modify to improve the objective function.
4. Identify constraints.
5. Define a search space that is the range of values that the design variables can take. It could be defined using lower and upper bounds or by a set of discrete values.
6. Select an optimization algorithm including one or more of a deterministic, heuristic, stochastic, machine-learning, reinforced-learning, deep-learning, or hybrid optimizer that may include one or more of gradient-descent, genetic, swarm-intelligence, simulated-annealing, particle-swarm, or other.
7. Identify one or more error-diffusion algorithm from the group consisting of multi-scale diffusion, fractal diffusion, depth-dependent, Zernike-coefficient diffusion, radial-basisdiffusion, power-dependent, diffusion-dependent, and content-aware.
8. Apply the selected optimization technique(s) to the error-diffusion algorithm to optimize one or more of the following: the threshold, the kernel coefficients, the kernel matrix, and scan path of the error-diffusion algorithm.
9. Evaluate the response of fabricated or simulated devices based on performance metrics such as wavefront error, Strehl ratio, side-lobes, gain, MTF, dispersion, or scatter at one or more wavelengths.
10. Iteratively refine the optimized error-diffusion algorithm using the evaluation results until the optimization-termination criterion is achieved.

---

This disclosure provides a software optimization tool that is used to design multi-material EM devices. This tool and associated methods can be used to fabricate lenses, antennas, phase plates, and absorbers with continuous or stepwise dielectric-index gradients, that are fabricated from two or more materials, using printing techniques. The software tool determines how to print the materials, with specific wavelength dependent dielectric properties, such that devices with a broad range of index values are achieved with performance optimized over one or more wavelengths.

The challenge of printing multiple materials concurrently, each with its individual wavelength-specific permittivity, permeability, loss tangent, or refractive-index spectrum, is that due to the limited number of materials available for printing, it can cause errors in the printed structure that cause deviations from the intended design performance. To minimize errors, a three-dimensional error-diffusion algorithm is used to convert the design to a bitmap for each printed material and distribute the errors to adjacent voxels, such that layer-by-layer a build map may be created.

A software optimization tool based on error-diffusion algorithms is described for fabricating three-dimensional opticGDP optics from two or more materials, so that device performance is optimized at one or more wavelengths. The error-diffusion algorithm works by adjusting the Dielectric Property Index profile at each point based on the errors introduced and the impact of these errors, to reduce them. To determine the optimal placement of each material, print maps (bitmaps) are generated through error diffusion using an optimization algorithm to adjust threshold, kernel size, shape and scan path. Polychromatic error diffusion can be performed directly or optimized parametrically taking into account drop volume, distance, diffusion, placement accuracy and other process related parameters. It also involves techniques such as depth-dependent or spatially adaptive error diffusion, to manage interaction between different wavelengths and materials.

One approach to optimizing for multiple wavelengths involves dividing the spectral range of interest into discrete bands or channels and optimizing the error-diffusion algorithm for each band or channel separately. This may involve adjusting the kernel coefficients or scan path for each band or applying different filters or fractal patterns for each band.

Another approach is to use a multi-spectral optimization algorithm that concurrently optimizes the error-diffusion algorithm for all wavelengths of interest. This may involve using a spectral model to calculate the chromatic aberration and dispersion for each material, and then optimizing the error-diffusion algorithm to minimize the total WFE across all wavelengths and materials.

Some error-diffusion algorithms may be inherently polychromatic, meaning that they are designed to preserve the chromatic properties of the image or design, in which case the dispersion is maintained after error diffusion.

Performing error diffusion for polychromatic designs, involves using a set of bitmaps that define each material by its dielectric property spectrum. Error diffusion can be used to minimize error at multiple wavelengths when printing with a printer that has a characteristic drop size and resolution. To do this, one determines the threshold to use, the kernel size, the kernel coefficients, and the algorithm scan paths.

The threshold determines which voxels are printed and which are not for each deposited material. This is done because it affects how much of each material is printed in order to achieve the desired refractive-index spectrum.

The kernel size defines how many neighboring voxels are taken into account when deciding whether or not to print a voxel. The kernel coefficients determine how much weight is given to each neighboring voxel when deciding whether or not to print a voxel. The scan path refers to the path that the error-diffusion filter uses to create the quantized bitmap.

Finally, the print paths determine in which direction the printer will move in order to print each voxel.

By adjusting these parameters according to the characteristics of the designs and of the printer, it is possible to minimize error at multiple wavelengths while still achieving the desired dielectric property gradient for each material. This allows for more accurate fabrication of gradient-index optical devices with multiple materials, resulting in higher quality dielectric optics.

6.1 Materials Models

When multiple materials are being printed concurrently, each material may have different optical properties, such as refractive-index spectral, or permittivity, permeability, or loss spectral characteristics, as well as physical and rheological properties, such as viscosity, surface tension, and curing time. These differences can result in non-uniformities and errors in the printed structure. By using an error-diffusion algorithm to convert the GRIN design to a bitmap, these errors can be minimized, resulting in a more accurate and uniform printed structure.

Each material used in fabricating GDP optics may be described by the tabulated dielectric properties at each wavelength such as the spectrally varying permeability, permittivity, refractive index, or loss. For refractive-index spectra, the wavelength dependence may be parameterized by index, dispersion, and partial dispersion, although more complex wavelength dependence can be described, for example by using the Cauchy and Sellmeier parameterization, or another polynomial representation of the index at each wavelength. These wavelength dependent properties may also be functions of temperature, and other external influences such as pressure, and may also be polarization dependent. Of course, because $n(\lambda)=\mathrm{sqrt}(\varepsilon(\lambda))$, where n is the index, and $\varepsilon$ is permittivity, wavelength-dependent models can be used to describe permittivity and permeability, as needed.

6.2 Process Model

A Process Model can be developed using the information obtained from the printing-process characterization and optical-property measurements. This Process Model can simulate the behavior of the printing process under different printing parameters. Based on the printing Process Model and the desired Material characteristics, an error-diffusion algorithm can be optimized that considers the various printing parameters such as drop size, diffusion between drops, viscosity of the inks, concentration of constituents in the optical inks, surface tension of the inks, distance between printed droplets, ligand properties, number of print passes, missing nozzles, alignment and calibration errors, and other process parameters.

The error-diffusion algorithm can be optimized using stochastic optimizers or genetic algorithms to minimize the wavefront error. Once the error-diffusion algorithm is developed and optimized, it may be validated using modeling and simulation or experimental measurements to ensure that it results in the desired refractive-index profile and minimized wavefront error.

6.3 Error-Diffusion Algorithm

Error-diffusion algorithms may be used for digital halftoning, which involves converting a continuous-tone image into a binary image with a limited number of 'gray' levels.

Error-diffusion algorithms can be used for converting gradient-index profiles. The best error-diffusion algorithm for complex gradient-index profiles depends on various factors, such as the desired accuracy, computational efficiency, and the specific requirements of the application.

The size of the filter used in an error-diffusion algorithm can have a significant impact on its effectiveness. The size of the filter used in an error-diffusion algorithm may be chosen based on a balance between smoothing and detail preservation, as well as computational efficiency. In some examples, a filter size of 3×3 or 5×5 may be used.

Generally, larger filter sizes result in smoother output images, but at the cost of increased computation time and potential loss of detail. Using a larger filter can help to spread out the error more evenly, which can lead to smoother and more visually pleasing results, should the human visual system (HVS) be included in the design metrics. However, a larger filter may also cause blurring or loss of sharpness in the image, particularly in areas of high contrast or fine detail.

When adapting these algorithms for a GDP device, where the HVS is not important, the algorithm can be optimized for the specific requirements of the device and task. The error-diffusion weights can be modified, and the number of quantization levels can be adjusted. Hardware constraints should also be considered. Once the algorithm has been adapted, it should be evaluated under different conditions to identify any limitations or areas for further optimization.

Floyd-Steinberg. One error-diffusion algorithm is the Floyd-Steinberg algorithm.

| — | X | 7 |
|---|---|---|
| 3 | 5 | 1 |

The central voxel, represented by X, has a weight of $7/16$, while the neighboring voxels have weights of $3/16$, $5/16$, $1/16$, and $1/16$, respectively. These coefficients were specifically chosen to mimic the sensitivity of the human visual system, and they have been shown to produce good results in reducing visual artifacts such as banding and contouring in images with limited wavelength depth. However, the algorithm distributes the error to neighboring voxels in a way that preserves the overall image structure, making it a good choice for gradient-index profiles.

The following is an example of a two-dimensional Floyd-Steinberg-like error-diffusion kernel modified for rotational symmetry:

|   |   | X | 7 | X |   |   |
|---|---|---|---|---|---|---|
|   | 3 | 5 | 1 | 5 | 3 |   |
| X | 7 | 0 | 0 | 0 | 7 | X |
|   | 3 | 5 | 1 | 5 | 3 |   |
|   |   | X | 7 | X.|   |   |

The two-dimensional algorithm may be used in each layer of a the graded dielectric-property device. However, a three-dimensional version, as shown below, allows for error to be distributed in three dimensionally:

| z = −1 | | | z = 0 | | | z = 1 | | |
|---|---|---|---|---|---|---|---|---|
| 1/32 | 2/32 | 1/32 | 2/32 | 4/32 | 2/32 | 1/32 | 2/32 | 1/32 |
| 2/32 | 4/32 | 2/32 | 4/32 | 8/32 | 4/32 | 2/32 | 4/32 | 2/32 |
| 1/32 | 2/32 | 1/32 | 2/32 | 4/32 | 2/32 | 1/32 | 2/32 | 1/32. |

The kernel directly above is a modification of the 2D Floyd-Steinberg kernel, with the addition of weights for the voxels in the third dimension (z). The center voxel has a weighting of $8/32$, and the neighboring voxels have weightings of $4/32$ adjacent to the center voxel and $2/32$ diagonal to the center voxel. This prophetic example has the $4/32$ weighting applied to the adjacent voxels in the z direction, $2/32$ applied in voxels that share an edge in the x-direction, and $1/32$ for voxels that share a corner. These values would be normalized to equal 1, by dividing by 3, when implemented.

Stucki algorithm. Another algorithm that may be used for gradient-index profiles is the Stucki algorithm, which also distributes the error to neighboring voxels. The Stucki algorithm tends to produce smoother images than the Floyd-Steinberg algorithm, but it is also more computationally intensive,

| — | — | X | 8 | 4 |
|---|---|---|---|---|
| 2 | 4 | 8 | 4 | 2. |

In the Stucki algorithm, the central voxel, represented by X, has a weight of $8/42$, while the neighboring voxels have weights of $4/42$, $2/42$, $1/42$, and $1/42$, respectively. These coefficients are designed to distribute the quantization error in a way that reduces visual artifacts while also preserving fine details in the image.

Jarvis-Judice-Ninke algorithm. Other error-diffusion algorithms that can be used for gradient-index profiles include the Jarvis-Judice-Ninke algorithm,

| — | — | X | 7 | 5 |
|---|---|---|---|---|
| 3 | 5 | 7 | 5 | 3 |
| 1 | 3 | 5 | 3 | 1. |

In the Jarvis-Judice-Ninke algorithm, the central voxel, represented by X, has a weight of $48/256$, while the neighboring voxels have weights of $12/256$, $26/256$, $30/256$, $26/256$, $12/256$, and $1/256$, respectively. These coefficients are designed to distribute the quantization error in a way that reduces visual artifacts and preserves fine details in the image.

This algorithm is particularly effective for images with a wide range of contrast levels and textures. The Jarvis-Judice-Ninke algorithm is similar to the Stucki algorithm, but the coefficients are slightly different. As with other error-diffusion algorithms, the coefficients in the Jarvis-Judice-Ninke algorithm can be modified to better suit the requirements of a specific image processing application.

Sierra algorithms. Like other error-diffusion algorithms, the coefficients in the Sierra algorithms are designed to distribute the quantization error in a way that reduces visual artifacts and preserves fine details in the image. This algorithm is particularly effective for images with high-frequency patterns and textures. The Sierra error-diffusion algorithm is well suited for images with continuous tones or gradients because it distributes the error between neighboring voxels in a way that preserves the gradient. It is a modified version of the Floyd-Steinberg algorithm that diffuses the error to a larger number of voxels, including voxels that are farther away from the current voxel being processed. This allows the algorithm to better preserve the details and smoothness of the gradient. Additionally, the Sierra algorithm uses a more complex set of weights to distribute the error, which allows for greater control over the final image quality. The coefficients can be modified to better suit the requirements of a specific image processing application.

The Sierra-3 Algorithm:

| — | — | X | 5 | 3 |
|---|---|---|---|---|
| 2 | 4 | 5 | 4 | 2 |
| 0 | 2 | 3 | 2 | 0 |
| 0 | 0 | 2 | 0 | 0. |

The Sierra-2 Algorithm:

| — | — | X | 4 | 3 |
|---|---|---|---|---|
| 1 | 2 | 3 | 2 | 1 |
| 0 | 1 | 2 | 1 | 0. |

The next three examples correspond to the Sierra error-diffusion algorithm. The following is a two dimensional SierraLite algorithm:

| x | 2/4 | 1/4 |
|---|---|---|
| 1/4 | 0/4 | 0/4. |

In this example, the kernel has a size of 2×3, with the center element of the kernel corresponding to the current voxel being processed. The weights assigned to the neighboring voxels are shown. The voxel to the right (x=1) has a weight of 2/4, which means that 50% of the error is diffused to the right. The voxel to the left (x=2) has a weight of 1/4, which means that 25% of the error is diffused to the left. The voxels (y=1, y=3) have weights of 1/4, which means that 25% of the error is diffused to the voxels in the y-axis. The total weight assigned to all neighboring voxels is equal to 1, ensuring that the total amount of error being diffused remains constant.

This same algorithm could be applied to the designs in the x-z axis, so that the values (z=1, z=3) would have weights of 1/4, which means that 25% of the error is diffused to the voxels in the z-axis.

The next example shows a rotationally symmetric Sierra-like algorithm:

| 1/12 | 2/12 | 1/12 |
|---|---|---|
| 2/12 | 0/12 | 2/12 |
| 1/12 | 2/12 | 1/12. |

The following is an example of a rotationally symmetric Sierra-like algorithm, which has diagonal bias that may be used with a spiral scan:

|  | z = −1 | | | z = 0 | | | z = +1 | | |
|---|---|---|---|---|---|---|---|---|---|
| y = −1 | 0/48 | 1/48 | 0/48 | 1/24 | 2/24 | 1/24 | 2/48 | 2/48 | 1/48 |
| y = 0 | 1/48 | 2/48 | 1/48 | 2/24 | 0/24 | 2/24 | 2/48 | 4/48 | 2/48 |
| y = +1 | 0/48 | 1/48 | 0/48 | 1/24 | 2/24 | 1/24 | 1/48 | 2/48 | 2/48. |

This kernel uses a set of coefficients that distribute the error from the high optical power region near the center of the lens to the edges of the lens. The coefficients of the z−1 and z plane are symmetrical in the x-y plane and preferentially weight the error diffusion towards the positive z direction, which pushes the error away from the front surface of the lens and towards the back edges. The distribution of the coefficients is designed to create a smooth transition of the error from the high optical-power region to the low optical-power regions at the edges, resulting in an overall reduction of the WFE of the GRIN lens. The diagonal in the z=1 plane can be used with the spiral scan to distribute error more evenly, depending on the device design.

In this example, the kernel has a size of 3×3×3, with the center element of the kernel corresponding to the current voxel being processed. The weights assigned to the neighboring voxels are as follows. The voxels to the right (x=1) have a weight of 2/24, which means that 8.3% of the error is diffused to the adjacent voxels. The voxels above (z=−1) have a weight of 2/24, which means that 4.15% of the error is diffused back, and 4/48 (8.3%) forward. The total weight assigned to all neighboring voxels is equal to 1.

Atkinson algorithm. The Atkinson algorithm is specifically designed to produce good results when printing images with a limited wavelength depth, such as black and white images. The Atkinson algorithm is as follows:

| — | — | X | 1 | 1 |
|---|---|---|---|---|
| 1 | 1 | 1 | 0 | 0 |
| 0 | 1 | 0 | 1 | 0 |
| 0 | 0 | 0 | 1 | 0. |

In general, algorithms such as Floyd-Steinberg and Jarvis-Judice-Ninke tend to work well for images with a lot of fine detail, while algorithms such as Atkinson and Burkes are better suited for images with larger areas of continuous tone. For a three-dimensional gradient-index optic design with radially-symmetric aspheric gradient index terms, an algorithm such as Sierra might be particularly effective, as it is designed to handle gradients in multiple directions.

To determine the optimal error-diffusion algorithm, it may be desirable to compare the results of several different algorithms using a variety of test images that are representative of the gradient-index profile being designed. The WFE can be calculated for each resulting optic and compared to the intended design to identify which algorithm produces the lowest error. The optimal algorithm may also depend on other factors, such as the droplet size and thickness, the printing resolution, and the properties of the materials being used.

6.4 Three-Dimensional Application of Error Diffusion

There are several methods of error diffusion that can be used for three-dimensional error diffusion, which involves extending two-dimensional error diffusion techniques to three dimensions. Some examples include the following.

Volumetric error diffusion. This method extends two-dimensional error diffusion to three dimensions by processing a volume of voxels rather than a two-dimensional image. The algorithm applies error diffusion to each voxel, considering the neighboring voxels in all three dimensions to determine the diffusion error.

Multi-slice error diffusion. This method divides a three-dimensional volume into a series of two-dimensional slices, and then applies two-dimensional error diffusion to each slice in turn. The resulting optimized slices are then stacked together to form the final optimized volume.

Depth-dependent error diffusion. This method uses a depth-dependent error-diffusion kernel that varies based on the distance of a voxel from the surface of the volume. The algorithm applies stronger diffusion to voxels closer to the surface, and weaker diffusion to voxels further away, to account for the varying depth-dependent properties of the material being printed.

These methods of error diffusion can be applied to optimize three-dimensional gradient profiles for manufacturing, by diffusing errors across the entire volume rather than just a two-dimensional image.

For example, a depth-dependent error-diffusion algorithm might take into account the varying index of refraction within the optic as light propagates through it. The algorithm may then calculate the index of refraction at each point in the optic based on the gradient-index profile and use this information to determine the appropriate diffusion coefficients for that point.

Another approach could be to use a continuous diffusion kernel that varies with depth based on the dielectric-quantity profile. This would involve calculating the diffusion coefficients at each point in the optic based on the local index of refraction and the desired level of diffusion. The coefficients would then be adjusted to ensure that errors are diffused in a direction that is consistent with the dielectric-quantity profile.

The depth-dependent error-diffusion algorithm takes into account the varying index of refraction as light propagates through the optic. One possible approach is to use a multi-pass algorithm that applies a series of error-diffusion kernels to the image, each pass accounting for the effects of the varying index of refraction at different depths.

In a multi-pass approach to depth-dependent error diffusion, each pass applies a different error-diffusion kernel to the design, with each kernel tailored to the properties of the material at a specific depth or range of depths. The goal is to gradually reduce the error in the image as it is diffused through the material, with each pass building on the previous one to refine the final image.

In a depth-dependent error-diffusion algorithm using multiple passes, the threshold can be adjusted in different ways to refine the bitmap in each pass. One approach is to use an adaptive thresholding technique that adjusts the threshold based on the local characteristics of the image.

One such technique is called the Otsu method, which calculates an optimal threshold by maximizing the between-class variance of the voxel dielectric values. This method works by assuming that there are two classes of voxels in the image, foreground and background, and finds the threshold that maximizes the separation between these two classes.

During each pass, the Otsu method can be applied to the grayscale image generated by the previous pass to determine a new threshold value. This new threshold will be used to convert the grayscale image to a binary image (i.e., a bitmap) for the next pass. By adjusting the threshold in this way, the algorithm can refine the bitmap in each pass, preserving more detail and contrast in the output.

The Otsu method determines an optimal threshold for separating an image into foreground and background regions based on the voxel dielectric values. In the context of a voxel of a gradient-index lens, the Otsu method can be applied to segment the voxel into different regions based on the variation in the refractive index.

Another approach is to use a fixed threshold value, which is set based on the characteristics of the input image and the desired output. In this case, the same threshold value is used for each pass, but the output from each pass can be combined with the previous passes to create a more refined final output.

In either case, the thresholding process plays an important role in the depth-dependent error-diffusion algorithm, and choosing the right thresholding technique and parameters can significantly impact the performance and quality of the resulting device, after deposition and processing. Proper threshold setting ensures optimal material placement, minimizing errors in refractive index gradients and enhancing the overall performance of the gradient index device. Furthermore, iterative refinement through multiple deposition cycles allows for precise control over the material gradient, improving the accuracy of the index profile and ensuring that the device meets specific functional requirements.

Creating a three-dimensional gradient-index optic involves dealing with volumetric data, which involves the use of three-dimensional error-diffusion algorithms. The choice of the optimal error-diffusion algorithm depends on several factors, including the nature of the gradient-index profile, the desired accuracy, and the computational resources available.

The volumetric Jarvis-Judice-Ninke algorithm is another popular choice for three-dimensional error diffusion. It works by dividing the voxel into multiple sub-voxels and propagating the error in three dimensions. This algorithm is particularly effective for images with fine details and low-contrast areas. This algorithm is known to produce smoother gradients compared to other error-diffusion algorithms.

The volumetric Sierra algorithm is also well-suited for creating three-dimensional gradient-index optics. It works by propagating the error to the neighboring voxels in a weighted manner, using a filter kernel that is adapted for volumetric data.

6.5 Fractal Error Diffusion

Fractal error-diffusion algorithms are a novel approach to preserving high-frequency information in an image while still diffusing errors. These algorithms use fractal patterns as the basis for their error-diffusion kernels, allowing them to capture the intricate and self-similar features of fractal patterns more accurately than other types of error-diffusion algorithms. The resulting accuracy and fidelity are particularly beneficial for complex or highly detailed images. Fractal error-diffusion algorithms can be optimized for specific types of images or designs, which can achieve even higher levels of accuracy and fidelity.

Compared to classical error diffusion techniques, such as Floyd-Steinberg error diffusion, fractal error-diffusion algorithms use a stochastic fractal distribution of diffusion coefficients that adaptively adjusts to the image content. This adaptivity enables fractal error diffusion to better preserve image features and details, especially in complex images with high spatial frequency content. Additionally, fractal error diffusion can create self-similar patterns at different scales, which is useful for generating textures or patterns.

The design of a fractal error-diffusion kernel involves balancing the tradeoff between preserving high-frequency information and diffusing errors. The kernel coefficients can be chosen to optimize the performance of the system for specific design requirements using simulation tools to determine the best kernel coefficients for a given set of design parameters. One approach to optimizing fractal error diffusion is to analyze the error using techniques such as Fourier analysis, wavelet analysis, or Zernike decomposition, and then use this feedback to update the kernel design or algorithm parameters.

Fractal error-diffusion algorithms can be used in the design of gradient-index optics, particularly in the context of dielectric index optics. For instance, a fractal error-diffusion algorithm can be used to optimize the design of an optic for multiple materials and colors, taking into account material dispersion and chromatic aberration. The algorithm applies an error-diffusion process to the Zernike coefficients of each voxel, with a fractal kernel that varies in scale and direction as a function of the position in the optic. This fractal kernel preserves the radial symmetry of the optic and minimizes WFE while also considering the material properties. The resulting design can be optimized for multiple wavelengths and materials and fabricated using various techniques, such as 3D printing, lithography, or laser writing. The algorithm can be applied to each material separately, using the properties of that material to guide the optimization. This can involve using different filter shapes or fractal patterns for each material or adjusting the threshold values based on the refractive index or dispersion of the material.

Fractal patterns can better preserve fine details. Fractal patterns are self-similar at different scales, which means that they can better preserve fine details in the gradient profile compared to other diffusion patterns. This can be important in situations where the design involves a high degree of precision.

Fractal patterns can better handle non-linearities. Gradient profiles can have non-linearities that make them difficult to optimize using other error-diffusion algorithms. Fractal error-diffusion algorithms can better handle these non-linearities by diffusing the error in a non-linear, self-similar pattern.

Fractal patterns can be customized to the specific design. Fractal error-diffusion algorithms can be customized to the specific design by adjusting the fractal pattern, filter shape, threshold settings, and other parameters. This allows the algorithm to be tailored to the specific requirements of the design, which can lead to better performance.

Fractal patterns can be efficient. Fractal error-diffusion algorithms can be more efficient than other error-diffusion algorithms in terms of computational resources. This is because the fractal pattern can be used to selectively choose which voxels to filter next, reducing the overall number of computations required.

Fractal error-diffusion algorithms and a multi-scale algorithms have some similarities in terms of their use of patterns that are self-similar at different scales. Both types of algorithms can be used to process and optimize images or gradient profiles for printing or manufacturing.

The following is an example of a fractal error-diffusion kernel:

| 0 | 0 | 0 | 7 | 5 |
| 3 | 5 | 7 | 5 | 3 |
| 1 | 3 | 5 | 3 | 1. |

In this example, the kernel has dimensions of 5×3, with the center voxel having a weight of 7. The weights decrease as one move away from the center voxel, following a pattern that resembles a fractal. This kernel could be optimized to preserve the radial symmetry, while a non-fractal kernel could be used to handle the aspheric terms.

There are many possible kernel designs for fractal error diffusion, but one approach is to use a self-similar fractal pattern as the basis for the diffusion kernel. This can be achieved by recursively applying a scaling and rotation transformation to a basic fractal pattern, such as the Sierpinski triangle or the Koch curve. The fractal error-diffusion kernel may start with a basic Sierpinski triangle pattern or Koch curve, and then recursively applying a scaling and rotation transformation to generate a more complex, self-similar pattern. This pattern can then be used to distribute error in a way that mimics the self-similar structure of the fractal. The key is to balance the complexity of the fractal pattern with the computational resources required to implement the algorithm, in order to achieve the desired level of error diffusion while maintaining reasonable performance.

One example of a fractal error-diffusion kernel that could be used is the Sierpinski gasket fractal. The Sierpinski gasket is a geometric pattern that can be iteratively generated by removing triangles from a larger triangle. The resulting fractal has self-similar properties and can be used as a diffusion kernel to preserve high-frequency information while diffusing errors. An example of an error diffusion based on a Sierpinski gasket fractal is given here:

| 0 | 0 | $\frac{1}{8}$ | 0 | 0 |
| 0 | $\frac{1}{8}$ | $\frac{2}{8}$ | $\frac{1}{8}$ | 0 |
| $\frac{1}{8}$ | $\frac{2}{8}$ | 0 | $\frac{2}{8}$ | $\frac{1}{8}$ |
| 0 | $\frac{1}{8}$ | $\frac{2}{8}$ | $\frac{1}{8}$ | 0 |
| 0 | 0 | $\frac{1}{8}$ | 0 | 0. |

In this kernel, the coefficients are based on a Sierpinski gasket fractal pattern, with higher coefficients corresponding to the 'filled' regions of the gasket and lower coefficients corresponding to the 'empty' regions. Another example of a fractal kernel that could be used for error diffusion in an optical system is the Sierpinski carpet fractal. This fractal has a self-similar structure with a repeating pattern of squares removed from a larger square. The Sierpinski carpet fractal can be represented as a matrix of values, where 1 represents the presence of material and 0 represents the absence of material. By applying this matrix as a filter, error diffusion can be performed in a way that preserves the self-similar structure of the fractal, which can lead to better overall performance of the optical system. An example of coefficients for a Sierpinski carpet fractal kernel is given below:

| $\frac{1}{8}$ | $\frac{1}{8}$ | $\frac{1}{8}$ |
| $\frac{1}{8}$ | 0 | $\frac{1}{8}$ |
| $\frac{1}{8}$ | $\frac{1}{8}$ | $\frac{1}{8}$. |

The fractal pattern has self-similarity and can be iteratively refined to produce increasingly detailed patterns. The above kernel uses the fractal pattern to diffuse errors in a way that preserves the intricate details of the original image or design.

In this example, the kernel is represented as a 3×3 matrix of values, where each value represents the weight of the corresponding voxel in the filter. This particular kernel has a sum of weights equal to 1, which means that it will preserve the overall brightness of the image when applied. When applying this kernel, the filter is placed over a portion of the input image, and the voxel values within the filter are multiplied by the corresponding kernel coefficients. The resulting values are then summed together to produce the output value for the center voxel in the filter. This process is repeated for every voxel in the image, with the filter shifted to a new position for each voxel.

Another example of a fractal error-diffusion kernel that could be used is the Koch curve fractal. The Koch curve is a fractal pattern that can be generated by iteratively replacing each line segment of a triangle with a new pattern that adds two additional line segments at a specified angle. Like the Sierpinski gasket, the resulting fractal has self-similar properties and can be used as a diffusion kernel to preserve high-frequency information while diffusing errors:

| 0 | 0 | 0 | 7 | 0 | 0 | 0 |
|---|---|---|---|---|---|---|
| 0 | 0 | 3 | 5 | 3 | 0 | 0 |
| 0 | 2 | 0 | 0 | 0 | 2 | 0 |
| 7 | 5 | 0 | 0 | 0 | 5 | 7 |
| 0 | 3 | 0 | 0 | 0 | 3 | 0 |
| 0 | 0 | 2 | 3 | 2 | 0 | 0 |
| 0 | 0 | 0 | 7 | 0 | 0 | 0. |

In this kernel, the values are scaled so that they add up to 48. The center value is 0, indicating that the error is diffused equally in all directions. The values in the kernel are based on the distances between the voxels in the Koch curve fractal, with higher values assigned to voxels that are farther away from their neighbors. The kernel can be used in an error-diffusion algorithm to preserve the intricate structure of the Koch curve fractal while still diffusing errors.

The Koch curve fractal could be applied as a multi-scale error-diffusion algorithm. One approach could be to use the Koch curve as a basis for a series of filters of different sizes or scales, each with their own set of diffusion coefficients and thresholds. The larger filters would capture larger-scale features in the image, while the smaller filters would capture finer details. The diffusion coefficients and thresholds could be optimized separately for each scale to minimize WFE for the given lens design and wavelength profile. The algorithm could then be applied in a multi-scale fashion, using the appropriate filter for each region of the image, to diffuse the error and generate a high-quality printed output.

To process a 3D GRIN design with a multi-scale error-diffusion algorithm using fractals, one may start by dividing the 3D volume into multiple sub-volumes or layers. Each layer can be processed independently using a fractal error-diffusion algorithm. One can choose the scale of the fractal kernel based on the size of the features in each layer. For smaller features, one can use a smaller scale fractal kernel, and for larger features, a larger-scale fractal kernel may be used.

The threshold for each layer can be adjusted based on the local image statistics. One can use a local adaptive thresholding technique, such as Otsu's method, to determine the optimal threshold for each layer. The diffusion coefficients for each layer can also be adjusted based on the scale of the fractal kernel. Smaller scale kernels use smaller diffusion coefficients to preserve fine details, while larger scale kernels use larger diffusion coefficients to avoid over-smoothing.

To ensure continuity between adjacent layers, one may use a diffusion map approach, where the diffusion coefficients and thresholds for each layer are smoothed across neighboring layers. A spatially varying filter may also be applied in order to correct for any errors introduced at the boundaries between adjacent layers.

| Algorithm 14. Optimizing a gradient-index optic design. |
|---|
| 1. Generate a representation of the graded-dielectric design as a set of fractal patterns.<br>2. Perform error diffusion on the fractal patterns to generate a set of bitmaps for each material used in the optic design.<br>3. Optimize the error-diffusion process by adjusting at least one of the following: a threshold value, a set of diffusion coefficients, and a scan pattern for the error diffusion.<br>4. Fabricate or simulate the gradient-index optic using the optimized bitmaps for each material. |

| -continued |
|---|
| Algorithm 14. Optimizing a gradient-index optic design. |
| 5. Measure the optical performance of the fabricated or simulated optic and update the fractal patterns and/or the error-diffusion process based on the measured performance. |

In some examples of this algorithm the three-dimension scan pattern may be selected from a group consisting of one or more of: raster, random, space filling, serpentine, and spiral-in.

6.6 Radial Basis Function (RBF)

One possible approach for radially symmetric designs could be to use a radial basis function (RBF) kernel that preserves the radial symmetry of the lens. The RBF may be used to calculate the weights of an error-diffusion algorithm. The RBF kernel can be designed to adaptively adjust its size and shape based on the local structure of the gradient design being processed, allowing it to better capture the details and features of the image.

To apply RBF kernels for error diffusion, a set of centers or anchor points are first chosen. These centers can be chosen randomly or based on some heuristic, such as clustering or feature detection. Once the centers are chosen, the RBF kernel can be defined as a function of the distance between a sample point and each center. The coefficients of the kernel can be adjusted to balance the tradeoff between preserving high-frequency information and diffusing errors.

The error-diffusion process using RBF kernels can then proceed iteratively, with the error at each voxel being diffused to its neighbors based on the distance between the centers and the sample point. The size and shape of the RBF kernel can adaptively adjust to the local structure of the image, allowing for more efficient and effective error diffusion.

An RBF kernel is a type of Gaussian filter that has a center point and a certain radius. The kernel weights are determined by the distance from the center point, following a Gaussian function. The RBF kernel can be designed to match the radial distribution of the refractive index in the lens, and the kernel can be adapted along the optical axis to match the varying aspheric terms.

Here is an example of a radial basis function (RBF) kernel that could be used to diffuse errors in a radially symmetric lens with a varying refractive index, $$k(r) = \begin{vmatrix} 1 & r & r^2 \\ r & 1 & r \\ r^2 & r & 1 \end{vmatrix},$$

where r=sqrt (x^2+y^2).

This kernel can be used for a variety of tasks, such as smoothing, classification, and regression. In the context of error diffusion, the RBF kernel can be used to distribute error in a way that adapts to the local structure of the device being processed. The kernel can be convolved with the image at each voxel to compute the amount of error to be diffused to neighboring voxels.

In this kernel, the center point corresponds to the highest index region of the lens, and the kernel weights decrease radially from the center point. The values in the kernel can be scaled to match the specific refractive index distribution in the lens.

To vary the kernel along the z-axis, one could apply a scaling factor to the kernel based on the distance from the center of the lens. For example, one could increase the size of the kernel for points farther from the center to account for the changing aspheric terms. Another approach could be to use a series of kernels with different radii, each matched to a specific region of the lens along the z-axis.

The specific method for varying the kernel along the z-axis will depend on the specifics of the GDP device design and the requirements of the application. It may be desirable to experiment with different kernel designs and parameters to find the best approach for a given design.

For this design, it may be best to start the scan at the center of the lens and spiral outwards towards the edge. The scan pattern should follow a spiral path, with each successive loop of the spiral covering a larger area than the previous one. This spiral pattern ensures that the-diffusion algorithm works in a continuous manner, with each voxel being diffused based on the values of its neighbors. The spiral pattern also helps to maintain the radial symmetry of the lens by diffusing errors radially outward from the center.

Performing a spiral scan strategy for a large filter can be computationally intensive and time-consuming. One approach to mitigate this is to break up the filter into smaller sub-regions and perform the spiral scan on each sub-region separately. The sub-regions can be selected based on the desired spatial resolution and the available computational resources.

6.7 Error Diffusion of Zernike Coefficients

Having the Zernike coefficients for each wavelength channel, one can perform error diffusion separately for each channel, generating a separate bitmap for each material or dielectric value. The resulting bitmaps can be combined to form a final bitmap that represents the optimized design for the GRIN lens across all wavelength channels.

---

Algorithm 15. Optimizing a graded dielectric-property device,

1. Define a multi-material graded dielectric-property device design using Zernike polynomials.
2. Optimize a Zernike-coefficient representation of the voxels of the GRIN design.
3. Use error diffusion of the Zernike coefficients to generate a bitmap for each material used to fabricate the GRIN lens.
4. Minimize error in the GRIN design using the optimized bitmaps for each material.
5. Simulate or fabricate the GRIN lens based on the optimized design.
6. Measure the wavefront error.
7. Decompose the wavefront error using Zernike polynomials.
8. Perform error diffusion on the Zernike coefficients of the wavefront error.
9. Update the bitmaps based on the Zernike coefficients bitmaps.
10. Repeat steps 5 through 8 as necessary to reduce the wavefront error.

---

In some examples of this algorithm, the optimization of the Zernike polynomial representation using error diffusion comprises adjusting threshold, kernel size and shape, kernel coefficients, and scan path to minimize error in the bitmap. In some examples of this algorithm, the design is optimized for multiple wavelengths or the average index and dispersion.

To combine the bitmaps for each wavelength channel, one can use a weighted average approach similar to the one used for multiple materials. The weight for each wavelength channel would be determined by the relative contribution of that wavelength to the final refractive index distribution of the lens.

The interdependence of Zernike coefficients for different wavelengths in a GRIN design can be accommodated by using a global optimization approach that concurrently optimizes the Zernike coefficients for all materials or dielectric values. This approach ensures that the Zernike coefficients for each wavelength are consistent with those of the other materials or dielectric values, taking into account the material properties and the desired optical performance of the GRIN device. The error-diffusion algorithm can then be applied separately to each wavelength to generate the optimized bitmaps for each material used in the GRIN device. The resulting bitmaps can then be used to fabricate the GRIN device using a suitable 3D printing.

A possible example of a fractal error-diffusion kernel that might be used in a radially-symmetric GRIN design with high order aspheric index terms that vary both radially and axially is the 'Iterated Function System' (IFS) kernel.

The IFS kernel is a type of fractal algorithm that generates a self-similar pattern by iterating a set of transformations on an initial shape. compression and generation. It is a set of mathematical functions that are iteratively applied to a set of points in a Euclidean space to generate a fractal image. IFS kernels are used in fractal image compression to generate a compact representation of an image by storing only the parameters of the IFS kernel and the initial attractor, rather than the voxel values of the image itself. The IFS kernel can then be used to regenerate the original image, or to generate variations of the image with different parameters or probabilities. IFS kernels are also used in the generation of fractal art and other forms of computer-generated graphics.

In an IFS kernel, each function in the set represents a geometric transformation that is applied to the input points. The transformations can include scaling, translation, rotation, and other operations that preserve the basic structure of the image. The IFS kernel also includes a set of probabilities that determine which transformation is applied at each iteration. The process of generating a fractal image using an IFS kernel involves iteratively applying the set of functions to an initial set of points, known as the attractor. As the iterations proceed, the attractor is transformed according to the probabilities specified in the IFS kernel. The result is a fractal image that exhibits self-similarity and other fractal properties.

In the context of error diffusion for a GRIN design, the IFS kernel could be used to adaptively adjust the diffusion coefficients based on local image characteristics, such as the gradient of the refractive index or the curvature of the surface. The IFS transformations would be defined based on the Zernike coefficients for each voxel in the GRIN design, allowing for the fractal error diffusion to be tailored to the specific design parameters.

One possible implementation of the IFS kernel for GRIN design optimization could involve using a set of pre-defined transformations, each corresponding to a specific Zernike coefficient. The transformations would be iteratively applied to each voxel in the GRIN design, with the resulting error diffusion coefficients updated based on the local image characteristics. The scan pattern could also be adaptively adjusted based on the IFS transformations, allowing for a more efficient and effective diffusion process.

Reducing a design to a set of fractal patterns for error diffusion involves breaking down the design into smaller sub-patterns or self-similar structures, each of which can be represented as a fractal. This process may be done by decomposing the GRIN design into a set of Zernike polynomials, a set of orthogonal functions that can represent arbitrary continuous functions. Each Zernike polynomial can be expressed as a combination of fractal patterns, which can then be used as the basis for the error-diffusion process.

To create the fractal patterns, the Zernike polynomials may be evaluated over a range of spatial scales, with each scale representing a different level of detail in the GRIN design. At each scale, the Zernike polynomial is evaluated at a set of sample points, which can then be used to generate a set of self-similar fractal patterns. These fractal patterns are combined to represent the Zernike polynomial at that scale, and the process is repeated for each scale until the entire GRIN design has been represented as a set of fractal patterns. These fractal patterns can then be used as input to the error-diffusion process to generate the optimized bitmaps for each material used in the GRIN design.

Once the error diffusion is complete for all materials, the resulting bitmaps are combined to form a single bitmap that represents the final optimized design for the GRIN lens. This can be achieved by applying a weighted average of the bitmaps based on the refractive index distribution of the lens. The final bitmap is then used to fabricate the GRIN lens.

To generate a separate bitmap for each wavelength using the Zernike coefficients approach, it is Zernike coefficients are defined for each wavelength channel. This can be done by determining the color-specific refractive-index profile and using it to calculate the Zernike coefficients for that channel.

6.8 Spatially-Adaptive Error Diffusion Technique

Another approach is to use a spatially adaptive error diffusion technique that adjusts the error-diffusion parameters based on the local properties of the refractive-index profile and dispersion. In this approach, the error-diffusion process is performed for the entire refractive-index profile and dispersion, but the error diffusion parameters are adjusted based on the local properties of the refractive-index profile and dispersion. For example, the error diffusion parameters may be adjusted based on the local gradient or curvature of the refractive-index profile and dispersion.

Spatially adaptive error diffusion is a powerful tool for optimizing a design for manufacturing by improving the print quality while reducing resource usage. By analyzing the local image characteristics and dynamically adjusting the diffusion coefficients, spatially adaptive error diffusion can produce high-quality images with minimal artifacts, making it an ideal choice for applications that require high-fidelity printing.

Spatially adaptive error diffusion is a type of error-diffusion algorithm that dynamically adjusts the diffusion coefficients based on the local image characteristics. In some error-diffusion algorithms, the diffusion coefficients are fixed and applied uniformly across the entire image, which can lead to artifacts in areas with varying image characteristics. Spatially adaptive error-diffusion algorithms overcome this limitation by analyzing the local image features and adjusting the diffusion coefficients accordingly.

Spatially adaptive error diffusion can optimize a design for manufacturing by improving the printability of the image. In some error-diffusion algorithms, the fixed diffusion coefficients can cause over- or under-diffusion in regions with high- or low-contrast, respectively, resulting in loss of detail or halos around edges. By adjusting the diffusion coefficients based on local image characteristics, spatially adaptive error diffusion can produce more accurate and detailed images.

One approach to spatially adaptive multi-scale error diffusion is to use a Gaussian pyramid, which is a hierarchical representation of the image at multiple scales. At each scale, the image is processed using a spatially adaptive error-diffusion algorithm that adjusts the diffusion threshold based on the local refractive-index spectrum.

By combining multi-scale processing with spatially adaptive methods, it is possible to achieve a more accurate result for error diffusion in GRIN optics. This approach allows for a fine-grained adjustment of the diffusion threshold based on the local optical properties of the materials, which can lead to a more precise correction of the wavefront error.

In the context of manufacturing, spatially adaptive error diffusion can optimize the production process by improving the print quality while minimizing the use of ink or other resources. By using spatially adaptive diffusion, the amount of diffusion applied can be reduced in areas with low-contrast or high detail, resulting in less ink usage and faster printing times.

6.9 Multi-Scale Error Diffusion Techniques

Multi-scale approaches can be effective for optimizing the error-diffusion algorithm for lenses with complex aspheric gradients. By processing the image at multiple resolutions or scales, the algorithm can better capture the fine details of the gradient profile while also smoothing out larger-scale features.

Multi-scale error diffusion can be an effective technique for minimizing the WFE of a GRIN optic made of two or more materials with different refractive-index spectra. By applying error diffusion at multiple scales and adjusting the diffusion kernel to the specific properties of each material, this technique can achieve a more accurate result than other error-diffusion algorithms applied at a single scale.

The basic idea behind this technique is to apply error diffusion at multiple scales, or levels of detail, in order to achieve a more accurate result.

The multi-scale error-diffusion algorithm works by first decomposing the image into multiple scales using a wavelet transform or a similar technique. The error-diffusion algorithm is then applied at each scale, starting with the highest level of detail and working down to the lowest level.

At each scale, the error-diffusion algorithm is applied using a diffusion kernel that is tailored to the specific refractive-index spectrum of the materials in that region of the image. This allows the algorithm to take into account the varying optical properties of the different materials and to adjust the diffusion threshold accordingly.

As the algorithm proceeds from the highest level of detail to the lowest, the error diffusion is refined at each scale, allowing for a more accurate result. Finally, the image is reconstructed by combining the error-diffused data from each scale.

There are also some key differences between fractal error diffusion and multi-scale algorithms. Fractal error-diffusion algorithms typically use a single fractal pattern to diffuse the error and optimize the gradient profile, whereas multi-scale algorithms use multiple scales or resolutions of the image to achieve a similar effect.

In a multi-scale algorithm, the original image is processed at multiple resolutions or scales, with each scale representing a different level of detail. The algorithm then combines the information from each scale to produce a final optimized image. This can be useful for preserving fine details in the image while also smoothing out larger-scale features.

In contrast, fractal error-diffusion algorithms use a single fractal pattern to diffuse the error in a self-similar way across the image or gradient profile. This can be particularly effective at preserving fine details and handling non-linearities in the gradient profile, but may not be as efficient as multi-scale algorithms for processing images with large variations in scale.

6.10 Multi-Scale Error Diffusion Using Zernike Polynomials

It is possible to use Zernike analysis to create a multi-scale error-diffusion algorithm based on Zernike polynomials. In this approach, the initial gradient profile is decomposed into Zernike polynomials using Zernike analysis, and the coefficients are used to calculate the error diffusion coefficients for each Zernike mode. The error diffusion coefficients are then applied using a multi-scale approach, where each scale represents a different level of detail in the gradient profile. At each scale, the error diffusion coefficients are applied to the corresponding Zernike modes to create a diffused gradient profile, which is then used as the input for the next scale. This process is repeated for multiple scales until the final diffused gradient profile is obtained. The advantage of this approach is that it can preserve the radial symmetry of the gradient profile while diffusing errors at different scales.

Each Zernike polynomial corresponds to a particular aberration mode, and the higher-order Zernike polynomials represent more complex aberrations that may be smaller in amplitude than the lower-order ones.

To determine the different scales in a multi-scale error-diffusion algorithm based on Zernike polynomials, one approach could be to divide the Zernike modes into groups based on their spatial frequency content. This can be done by looking at the number of cycles of the aberration pattern per unit distance, which can be estimated from the radial order of the Zernike polynomial.

For example, the lowest-order Zernike polynomial (Z1) represents a constant phase across the aperture and can be considered as a low-frequency mode. In contrast, the higher-order Zernike polynomials with larger radial order, such as Z5 (astigmatism) and Z7 (coma), have higher spatial frequencies and can be considered as mid-frequency modes. The even higher-order Zernike polynomials with even larger radial order, such as Z11 (spherical aberration) and Z13 (secondary coma), have even higher spatial frequencies and can be considered as high-frequency modes.

Based on these groupings, a multi-scale error-diffusion algorithm can be designed to adaptively apply different diffusion kernels and thresholds to each group of Zernike modes to optimize the overall wavefront error.

Error diffusion can be applied to groups of Zernike coefficients for each voxel to achieve a multi-scale error diffusion. One way to do this is to group the Zernike coefficients into different orders, and then apply error diffusion separately to each group. Another way is to divide the 3D volume into different sub-volumes and apply error diffusion to each sub-volume separately.

The benefit of using fractal error diffusion in this case is that it can effectively distribute errors over a wide range of spatial scales. This is important because GRIN devices often have complex refractive index distributions that vary on many different length scales, and errors can easily propagate and accumulate throughout the device. Fractal error diffusion can help mitigate this by breaking up the error distribution into smaller and smaller spatial scales, allowing for more precise control over the final output. Additionally, fractal error diffusion is an iterative process that can be applied multiple times at different scales, allowing for even finer control over the error distribution.

6.11 Wavelet-Based Error Diffusion

Wavelet-based error diffusion is a technique that can be used for discretizing a GRIN optic design. Wavelets are mathematical functions that are well-suited for analyzing and compressing signals and images. Wavelet-based error diffusion uses a wavelet transform to decompose an image into different frequency bands, and then applies error diffusion to each frequency band separately. This approach can help to preserve high-frequency details and edges in the image, while reducing the amount of noise and other artifacts in the output. Wavelet-based error diffusion can also be combined with other techniques, such as fractal error diffusion, to further optimize the output image.

6.12 Thresholding

The determination of the optimal threshold levels and filter coefficient values for an error-diffusion algorithm in the context of converting a gradient-index lens design to a binary or multi-material bitmap depends on several factors, including the characteristics of the input data, the desired output quality, and the specific error-diffusion algorithm being used.

The threshold level determines how much error is diffused to neighboring voxels. A higher threshold level means that less error is diffused, resulting in sharper edges but potentially more noticeable artifacts such as banding. A lower threshold level means that more error is diffused, resulting in smoother gradients but potentially softer edges.

In general, the threshold level for an error-diffusion algorithm may be determined empirically through trial and error, or by analyzing the characteristics of the input data to identify an appropriate threshold value. One approach is to perform multiple iterations of the algorithm with different threshold values and compare the resulting output to determine the best threshold level.

Similarly, the optimal filter coefficient values can also be determined empirically through experimentation, or by analyzing the characteristics of the input data to identify an appropriate filter matrix size and coefficients. One may use a small filter matrix size to avoid excessive blurring of the image, while adjusting the filter coefficients to achieve the desired level of smoothing.

Overall, the determination of the optimal threshold levels and filter coefficient values for an error-diffusion algorithm is a complex process that involves careful consideration of the specific application and input data.

When setting the threshold for error diffusion in the context of making gradient-index optics, there are several possible approaches to consider. One approach is to minimize the RMS WFE over a range of wavelengths by simulating the performance of the lens and adjusting the threshold until the RMS WFE is minimized. Another approach is to use an optimization algorithm, such as a genetic algorithm or a gradient-based optimization algorithm, to find the optimal threshold value that minimizes the WFE at multiple wavelengths. Experimental measurements can also be used to determine the optimal threshold value, but may be difficult or expensive to implement. A simulation-based optimization approach, such as a Monte Carlo or a finite element method, can provide a more accurate and comprehensive optimization of the lens performance, but can be computationally intensive. The choice of approach will depend on the specific characteristics of the lens and the available resources for experimentation or simulation, and an iterative optimization process may be used to achieve the desired level of performance.

Adaptive thresholding can be used to adjust the threshold value for each voxel based on the local image statistics. This can be particularly effective for optimizing the error-diffusion algorithm for high order aspheric gradients, which may have non-uniform intensity and contrast.

To adaptively vary the diffusion kernels and thresholds for a three-dimensional error diffusion map based on measured results, a model is developed that relates the measured WFE to the algorithm parameters. This model can be used to adjust the parameters, such as the diffusion kernels and thresholds, iteratively until the desired results are achieved.

Surface-originating errors that propagate through the device should be corrected at the first several layers of the device. This can be done by adjusting the diffusion kernels and thresholds for these layers specifically, or by applying a correction factor to the error-diffusion algorithm for these layers. The key to optimizing the error-diffusion algorithm is to evaluate the results of the optimization process to ensure that the WFE is minimized and that the desired optical properties of the device are achieved.

6.13 Voxel Size

Determining the optimal voxel size for an error-diffusion algorithm depends on various factors such as the desired resolution, the size and shape of the drops, and the diffusion rate of the ink constituents. Generally, the voxel size may be smaller than the drop size to ensure accurate representation of the gradient-index profile. However, excessively small voxel sizes can result in longer processing times and larger file sizes.

In addition to voxel size, the diffusion rate of the ink constituents is also an important factor to consider. If the diffusion rate is too high, the gradient-index profile may blur and lose its desired sharpness. On the other hand, if the diffusion rate is too low, the gradient-index profile may not be accurately represented, leading to errors in the final optical device.

Overall, determining the optimal voxel size and other parameters for an error-diffusion algorithm for 3D gradient-index optics can be a complex process and may involve some experimentation and optimization.

The placement of drop deposition for sub-voxel dimensions is determined by the desired gradient-index profile. Typically, the sub-voxel size is chosen to be smaller than the size of the smallest voxel that can be printed. For example, if the smallest voxel that can be printed is 40 microns, the sub-voxel size could be chosen to be 4 microns or smaller.

For sub-voxel dimensions, the algorithm may calculate the weighted average of the neighboring sub-voxel values. The placement of the drop deposition for each sub-voxel is determined by the desired gradient-index profile and the sub-voxel size. The goal is to ensure that the deposited drops are distributed in a way that produces the desired gradient-index profile when the sub-voxels are combined to form voxels.

Once the sub-voxel size is chosen, the sub-voxel placement can be determined using a random or pseudo-random number generator. To accommodate the fact that drops cannot be placed on top of each other, the sub-voxel placement of drop deposition can be randomized or pseudo-randomized within a sub-voxel. This ensures that the distribution of drop positions is uniform, and that no two drops will be deposited in the same location.

6.14 Scan Pattern

The scan pattern used in a three-dimensional (3D) error-diffusion algorithm can have a significant impact on the quality of the output. In general, the scan pattern determines the order in which the algorithm processes the image data, and different scan patterns can lead to different levels of spatial and temporal coherence in the output.

Spiral scan. One approach is to use a spiral scan path that starts at the center of the device and spirals outward. This scan path can provide good coverage of the device while minimizing the distance that the scanning system must travel.

Serpentine scan. Another approach is to use a serpentine scan path that moves back and forth across the device in a zigzag pattern. This scan path can also provide good coverage of the device, but may involve more movement of the scanning system.

Random scan. A third approach is to use a random scan path that moves the scanning system randomly across the device. This can provide good coverage of the device and may be useful for minimizing the impact of certain types of errors, such as periodic errors.

Adaptive scan. Finally, an adaptive scan path can be used where the scanning path is adjusted based on the measured error in previous scans. For example, if a certain area of the device is found to have higher error than others, the scanning system can adjust to spend more time in that area to improve the overall performance of the error-diffusion algorithm.

The error-diffusion algorithm is a method used to optimize the design of gradient-index optics by iteratively adjusting the refractive-index profile to improve the optical performance. The starting point of the algorithm can depend on the specific design problem and the goals of the optimization.

It may be advantageous to start the error-diffusion algorithm at the front surface of the device and work towards the back surface. This is because the front surface is the point where the light enters the device, and any errors or imperfections in the refractive-index profile at this point can have a significant impact on the overall performance of the device.

However, depending on the specific design problem, it may be more appropriate to start the error-diffusion algorithm at a different location. For example, if the device is designed to have a specific focal point, it may be more effective to start the algorithm at the point where the focal point is expected to be located.

Ultimately, the best starting point for the error-diffusion algorithm will depend on the specific design problem, and may involve some experimentation and analysis to determine the most effective approach.

A 3D serpentine pattern may offer several advantages over a raster pattern. First, a 3D serpentine pattern can reduce the appearance of banding artifacts, which can be especially problematic when printing high-precision GRIN designs. This is because a 3D serpentine pattern helps to distribute the error diffusion across multiple planes, reducing the likelihood of visible bands or steps in the final output.

Second, a 3D serpentine pattern can help to reduce the amount of time to print the GRIN design. This is because a serpentine pattern can effectively utilize the printing area, minimizing the amount of wasted space between droplets and reducing the overall number of droplets required to complete the design.

However, a 3D serpentine pattern may also have some disadvantages compared to a raster pattern. For example, a 3D serpentine pattern may involve more complex printer control software to implement and may be more challenging to optimize for specific GRIN designs. Additionally, a serpentine pattern may not be ideal for certain types of GRIN designs or materials, such as those with highly non-uniform refractive index distributions.

It is possible to apply the error-diffusion algorithm in a different scan pattern than the one used for printing. This can be done by mapping the error-diffusion algorithm to the desired scan pattern during post-processing. For example, if the printing is done in a serpentine pattern, but the desired scan pattern for error diffusion is a raster pattern, the error-diffusion algorithm can be applied to the serpentine data and then remapped to the raster pattern during post-processing. Similarly, other scan patterns such as three-dimensional serpentine, rotational, Hilbert space, or random can be applied to the error-diffusion algorithm during post-processing as well. The key is to ensure that the mapping between the printing pattern and the error diffusion pattern is accurately and consistently maintained.

A scan pattern available for a 3D error-diffusion algorithms is the 'spiral' or 'raster' scan pattern, where the algorithm processes the image data in a series of concentric circles or rectangular rows. This scan pattern is easy to implement. However, other scan patterns can also be used, such as 'serpentine' or 'zigzag' patterns that alternate the processing direction between rows, or 'Hilbert' or 'Morton' patterns that are designed to minimize the spatial and temporal coherence of the output.

The choice of scan pattern will depend on several factors, including the desired output quality, the computational resources available, and the specific characteristics of the 3D printing process. Modeling and simulation, supported by experimentation of the different scan patterns along with other algorithm parameters to find the optimal settings for a particular application.

The choice of diffusion kernel will depend on the specific shape of the dielectric property gradients (the 'Design' herein) and the manufacturing process (the 'Process' or 'Factory' herein). An appropriate diffusion kernel should take into account the shape and size of the gradients, as well as any depth-dependent properties of the material being printed. For an EM device, including optical devices, that generally includes most of the thickness of the device.

In terms of scan pattern, an optimal pattern for minimizing errors in a radial dielectric index material might involve scanning in a spiral pattern starting from the center of the optic and working outward. This would ensure that errors are diffused in a direction that is consistent with the dielectric-quantity profile, which in this case might be highest at the center of the optic and decreasing toward the edges.

In addition to the scan pattern, the specific diffusion coefficients used in the algorithm would be carefully chosen to ensure that errors are diffused appropriately at each depth. The coefficients would likely be adjusted based on the index of refraction at each point in the optic, as well as the desired level of diffusion at that depth.

6.15 Initiate Scan at Area of Highest Optical Power at Incident Surface

Starting the error diffusion at the front surface with the most optical power may be a reasonable approach for reducing errors early on in the device. Performing error diffusion in the direction that light travels could potentially improve the performance of the device, especially in situations where the device has significant optical power. By starting the error diffusion at the front surface and progressing towards the back, the errors are corrected along the path of the light, allowing for better overall performance.

It may be beneficial to first traverse in the z-direction, along the optical axis, to diffuse error in the direction that light propagates before diffusing error in the radial directions. By diffusing error in the z-direction first, the algorithm can account for the varying refractive index at different depths in the optic and reduce the impact of errors on the wavefront. Once the error has been diffused in the z-direction in the area of the most optical power, or dispersion, it may be beneficial to spiral in the x-y plane to diffuse error in the radial directions, as this can further refine the image and reduce any remaining errors.

The strategy for determining the scan path of the three-dimensional device will depend on the specific requirements of the device and the characteristics of the error-diffusion algorithm being used. It may be desirable to experiment with different scan paths to determine the optimal approach for a given device and algorithm. The scan path for a three-dimensional device can have a significant impact on the performance of the error-diffusion algorithm. Here are some strategies for determining the scan path.

6.16 Error Analysis

It is possible to develop an error-diffusion algorithm based on Zernike polynomials. The basic idea is to perform Zernike decomposition of the WFE and apply error diffusion to the individual Zernike terms.

To manufacture a gradient-index optical device using multiple materials, each with a refractive-index spectrum, a printer with a specific drop size and material interdiffusion is used. The goal is to identify the optimal material for each voxel to minimize wavefront error. An error-diffusion algorithm based on Zernike polynomials can be developed for this purpose. The first step is to perform Zernike decomposition of the WFE using a suitable algorithm. Then, the error-diffusion algorithm is applied to the individual Zernike terms while preserving the spatial structure of the Zernike terms. Once the error diffusion has been applied to each Zernike term, the resulting WFE can be reconstructed by summing the individual Zernike contributions. The optimized GRIN design can then be generated by applying the appropriate phase profile to the GRIN material. The potential benefits of such an approach include improved control over the WFE and the ability to optimize the design for specific Zernike modes or other performance criteria.

To update the original bitmaps to reduce the wavefront error, a closed-loop optimization approach can be used. This involves measuring the WFE after fabrication, performing a Zernike decomposition of the error, and using this information to update the original bitmaps. One possible approach is to use a gradient-descent optimization algorithm to update the bitmap values based on the Zernike coefficients of the wavefront error. The algorithm would start by computing the Zernike coefficients of the WFE and using them to compute the gradient of the error with respect to the bitmap values. This process would be repeated iteratively until the WFE is reduced to an acceptable level.

To convert the optimized refractive-index profile into a binary bitmap for each material, the error-diffusion algorithm, such as Floyd-Steinberg or Stucki, can be used in conjunction with the Zernike-based Multilevel optimization process. The error-diffusion algorithm is used to distribute the error between the desired and actual refractive-index profile to neighboring voxels, allowing for a smoother transition between adjacent voxels and reducing the overall error. This helps to improve the accuracy of the final fabricated GRIN optic.

To change a GRIN design to a set of voxels with Zernike coefficients, the continuous refractive-index profile is first discretized into a three-dimensional voxel grid. The Zernike coefficients for each voxel can then be used to generate a bitmap for each ink, using error diffusion techniques such as the Floyd-Steinberg, Stucki, or other algorithms. The threshold settings, number of coefficients, and their values can be optimized using multi-level optimization techniques to achieve the desired optical power and dispersion properties. The starting point of the three-dimensional scan can also be optimized using various scanning patterns, such as the Hilbert scan, serpentine scan, spiral scan, or fractal scan, to ensure efficient and effective convergence to the optimal solution.

To reduce a design to a set of fractal patterns for error diffusion, the design is broken down into smaller sub-patterns or self-similar structures, each of which can be represented as a fractal. This process helps to improve the efficiency of the error-diffusion algorithm and reduce the overall error in the final fabricated GRIN optic. This is summarized as follows.

---

Algorithm 16. Reducing a design to a set of fractal patterns.

---

1. Discretize the continuous refractive-index profile
into a three-dimensional voxel grid.
2. Calculate the Zernike coefficients for each voxel based
on its refractive index value and the desired Zernike basis functions.
3. Generate a bitmap for each ink, using error diffusion techniques
such as the Floyd-Steinberg, Stucki, or other algorithms.
4. Optimize the threshold settings, number of coefficients,
and their values using multi-level optimization techniques to
achieve the desired optical power and dispersion properties.
5. Optimize the starting point of the three-dimensional scan using
various scanning patterns, such as the Hilbert scan,
serpentine scan, spiral scan, or fractal scan, to ensure efficient and
effective convergence to the optimal solution.
6. Use a closed-loop optimization approach to update the
original bitmaps and reduce the wavefront error.
7. Measure the WFE after fabrication or building the pseudo-optic.
8. Perform a Zernike decomposition of the error, and use this
information to update the original bitmaps.
9. Apply the appropriate phase profile to the GRIN
material to generate the optimized GRIN design.

---

To implement this approach, the first step is to perform Zernike decomposition of the WFE using a suitable algorithm, such as the least-squares method or the Gram-Schmidt orthogonalization. This will provide a set of Zernike coefficients that represent the wavefront error.

Next, the error-diffusion algorithm is applied to the individual Zernike terms. This can be done using a variety of techniques, such as the Floyd-Steinberg algorithm, the Stucki algorithm, or other error diffusion methods. The key is to apply the algorithm in a way that preserves the spatial structure of the Zernike terms, which may involve modifying the error-diffusion algorithm to account for the specific properties of Zernike polynomials.

Once the error diffusion has been applied to each Zernike term, the resulting WFE can be reconstructed by summing the individual Zernike contributions. The optimized GRIN design can then be generated by applying the appropriate phase profile to the GRIN material.

Overall, the implementation of a Zernike-based error-diffusion algorithm for GRIN design optimization involves consideration of the specific properties of the GRIN material, the printing process, and the error-diffusion algorithm itself. However, the potential benefits of such an approach include improved control over the WFE and the ability to optimize the design for specific Zernike modes or other performance criteria.

6.17 Optimization

Determining the optimal error-diffusion algorithm for a specific gradient-index optic design involves experimentation and evaluation of different algorithms. Some factors that can affect the choice of algorithm include the complexity of the gradient-index profile, the desired accuracy of the final optic, and the limitations of the fabrication process. Performing optimization of three-dimensional error-diffusion algorithms can be done through a variety of methods, including using reinforcement learning, genetic algorithms, or gradient-descent methods.

There are several deep-learning optimization techniques that can be applied to improve the performance of error-diffusion algorithms, such as convolutional neural networks (CNNs), recurrent neural networks (RNNs), and generative adversarial networks (GANs).

---

Algorithm 17. Optimizing the error-diffusion algorithm for a
gradient property device made of two or more materials.

---

1. Generate a large dataset of input-output pairs of gradient-property
designs or design features with corresponding optimized
error-diffusion algorithms and settings.
2. Train a deep-learning model using the generated dataset to learn the
optimal kernel, coefficients, and scan path of the error-diffusion algorithm.
3. Evaluate the trained error-diffusion algorithm using one or more
performance metrics, including wavefront error, Strehl ration,
side-lobes, gain, MTF, texture, or scatter at one or more wavelengths.
4. Iteratively refine the trained error-diffusion algorithm using the
evaluation results until a desired level of performance is achieved.

---

Algorithm 18. Optimizing the error-diffusion algorithm
for a gradient property device made of two or more materials.

---

1. Use deep learning to recognize the general class of design of the
gradient-property device, including based on the properties of its
polynomial or Zernike representations, its Fourier content, its
wavelet content, or performance requirements.
2. Set initial kernel size, kernel shape, coefficient values, threshold
settings,and scan paths of the error-diffusion algorithm based on the
recognized class of design.
3. Apply the error-diffusion algorithm to the gradient-property
device to create an gradient profile.
4. Evaluate the image using one or more performance metrics,
which may include wavefront error, Strehl ratio, MTF, contrast, noise,
resolution, spatial energy, and texture.
5. Use the evaluation results to update the error-diffusion algorithm by
adjusting one or more of the kernel size, kernel shape, coefficient values,
threshold settings, and scan paths for one or more parts of the design.
6. Re-apply the updated error-diffusion algorithm
to the gradient index device.
7. Iteratively repeat steps 4 through 6 until a desired
level of performance is achieved.

---

It may be possible to automate the optimization process by training a deep-learning system to recognize patterns in the high-order polynomial functions or GRIN profiles and determine the optimal error-diffusion algorithm. This would involve a large dataset of simulated or measured data, as well as a carefully designed network architecture that is capable of accurately predicting the optimal algorithm for a given set of parameters.

Additionally, it may be possible to develop rules or heuristics that can guide the optimization process based on known properties of the GRIN design. For example, if the GRIN profile is highly symmetric, then certain error-diffusion algorithms may be more effective than others. Similarly, if the gradient rate is high, then certain algorithms may be more effective at minimizing wavefront error. These rules could be built into an automated optimization algorithm to help guide the selection of the optimal error-diffusion algorithm.

Another approach is to use reinforcement learning, where the algorithm learns through trial-and-error by interacting with the environment (i.e., the design and its performance metrics). The algorithm can be designed to optimize the error-diffusion algorithm parameters based on feedback from the environment, with the goal of maximizing the performance metric. The algorithm can be trained on a set of known designs and their corresponding Zernike coefficients, with the goal of minimizing the error between the original design and the final fabricated device. The reinforcement learning algorithm would adjust the error diffusion parameters such as threshold, kernel size, kernel shape, and kernel coefficients, as well as the scan path, in order to optimize the error.

Another approach could be to use a genetic algorithm, where the error diffusion parameters are treated as genes that can be mutated and recombined in order to produce an optimal set of parameters. The genetic algorithm would evaluate the fitness of each set of parameters by measuring the error of the resulting device and selecting the best performing parameters for mutation and recombination in the next generation.

A third approach could be to use gradient-descent methods, which optimize the error-diffusion algorithm parameters by iteratively adjusting them in the direction of steepest descent of the error function. This approach involves defining a cost function that measures the error between the original design and the fabricated device, and then iteratively adjusting the error diffusion parameters until the cost function is minimized.

Deep learning can be applied in various ways for optimization in three-dimensional error-diffusion algorithms. One approach is to use a neural network to predict the optimal values for the error-diffusion algorithm parameters based on the Zernike polynomials and other design variables. The neural network can be trained on a dataset of designs with known performance metrics, and then used to predict the optimal parameter values for new designs.

There are several feedback mechanisms that can be applied to make the error-diffusion filters adaptive. Some of them are as follows.

Direct Feedback. In this mechanism, the output of the filter is compared to the desired output, and the error signal is used to update the filter coefficients. The filter is adjusted in real-time to minimize the error between the output and the desired output.

Reinforcement Learning. This is a machine-learning technique where the filter learns through trial and error by receiving feedback from the environment. The filter adjusts its coefficients based on the reward signal received from the environment.

Zernike decomposition. The Zernike coefficients of the WFE can be computed and used to identify the dominant aberrations in the system. These coefficients can then be used to adaptively adjust the error-diffusion algorithm threshold and coefficients.

Simulation feedback. A simulation of the optical system can be run using the current error-diffusion algorithm settings, and the resulting WFE can be compared to the desired wavefront error. This feedback can be used to adaptively adjust the error-diffusion algorithm threshold and coefficients to improve the wavefront error.

Machine learning. A machine-learning algorithm can be trained to predict the optimal error-diffusion algorithm settings based on the input GRIN design and the desired output wavefront error. This feedback can be used to adaptively adjust the error-diffusion algorithm threshold and coefficients in real-time to achieve the desired wavefront error.

Neural Networks. Neural networks can be used to learn the error-diffusion filter. The neural network takes the input and output signals and learns the mapping between them. Once trained, the neural network can be used to predict the filter coefficients for a given input signal.

Genetic Algorithms. Genetic algorithms can be used to optimize the filter coefficients. The filter coefficients are treated as a population of individuals, and the fittest individuals are selected for breeding. The offspring inherit the characteristics of their parents, and the process is repeated until the desired fitness level is reached.

These feedback mechanisms can be combined to create a hybrid adaptive system that can learn and improve over time.

Overall, determining the best error-diffusion algorithm for a complex three-dimensional gradient-index optic involves a combination of simulation and experimental validation, and careful consideration of the specific characteristics of the device and the fabrication process.

A genetic algorithm is another optimization technique that can be used to optimize the error-diffusion algorithms in a gradient-index optic. It is a metaheuristic optimization algorithm that is based on the principles of natural selection and genetics. The algorithm iteratively generates new solutions and selects the best solutions based on a fitness function.

Optimization methods such as stochastic optimization and genetic algorithms can be integrated with ray-tracing algorithms or other optical-design packages to optimize the error-diffusion algorithms in a gradient-index optic.

By integrating the optimization method with the ray-tracing algorithm or other optical-design package, the objective function can be accurately computed, and the performance metrics can be optimized more efficiently. This can result in improved optimization of the error-diffusion algorithms for gradient-index optics.

Deep learning can also be integrated with ray-tracing algorithms or other optical-design packages to optimize the error-diffusion algorithms in a gradient-index optic. By integrating deep-learning with the ray-tracing algorithm or other optical-design package, the objective function can be accurately computed and optimized more efficiently. This can result in improved optimization of the error-diffusion algorithms for gradient-index optics. Integrating the error-diffusion algorithm directly into the optical design process can improve the overall design efficiency and accuracy.

One embodiment of this disclosure is to incorporate optical-design software package that has the capability to incorporate custom error-diffusion algorithms into its design workflow.

The first step in this process is to develop and optimize the error-diffusion algorithm as described earlier. Once the algorithm is validated and optimized, it can be integrated into the optical-design software package. The software package can then be used to design the desired gradient-index optic, taking into consideration the error-diffusion algorithm and other relevant parameters.

During the design process, the software package can simulate the printing process and the resulting refractive-index profile using the integrated error-diffusion algorithm. This enables the designer to evaluate the performance of the designed gradient-index optic, including its wavefront error, before it is fabricated. Any adjustments to the design or error-diffusion algorithm can be made in real-time within the software package.

Figure 8:
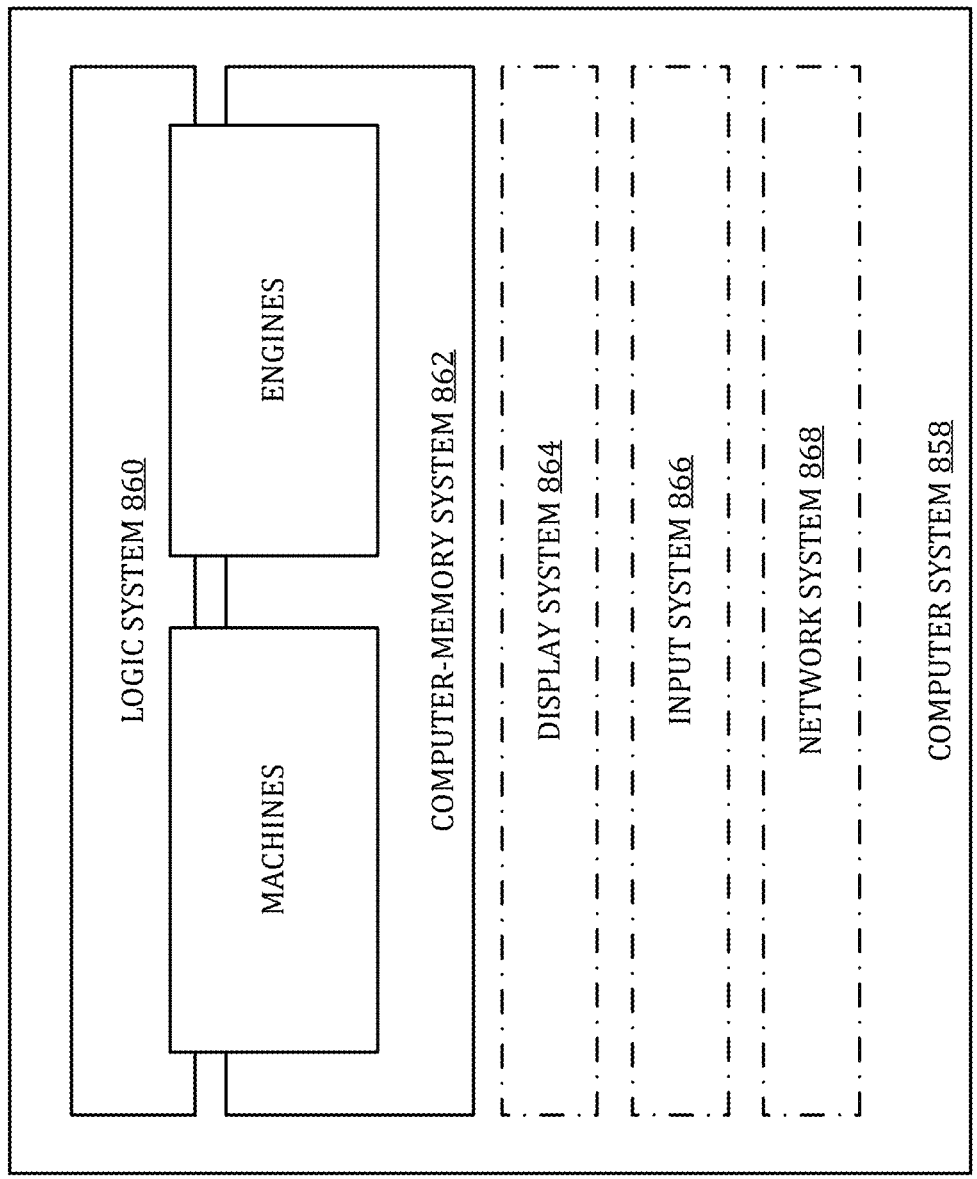
FIG. 8 shows aspects of an example computer system.

FIG. 8 provides a schematic representation of a computer system 858 configured to provide some or all of the computer functionality disclosed herein. The computer system may support and/or embody the halftoner and/or optimizer systems herein. Computer system 858 may take the form of desktop, laptop, or tablet computer system, a server system, or virtually any type of digital computer system.

Computer system 858 includes a logic system 860 and a computer-memory system 862. Computer system 858 may optionally include a display system 864, an input system 866, a network system 868, and/or other systems not shown in the drawings.

Logic system 860 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 862 includes at least one physical device configured to temporarily and/or permanently hold computer system information, such as data and instructions executable by logic system 860. When the computer-memory system includes two or more devices, the devices may be collocated or remotely located. Computer-memory system 862 may include at least one volatile, nonvolatile, dynamic, static, read/write, read-only, random-access, sequential-access, location-read addressable, file-read addressable, and/or content-read addressable computer-memory device. Computer-memory system 862 may include at least one removable and/or built-in computer-memory device. When the logic system executes instructions, the state of computer-memory system 862 may be transformed—e.g., to hold different data.

Aspects of logic system 860 and computer-memory system 862 may be integrated together into one or more hardware-logic components. Any such hardware-logic component may include at least one program- or application-specific IC (PASIC/ASIC), program- or application-specific standard product (PSSP/ASSP), system-on-a-chip (SOC), or complex programmable logic device (CPLD), for example.

Logic system 860 and computer-memory system 862 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 864 may be used to present a visual representation of data held by computer-memory system 862. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 866 may comprise or interface with one or more input devices. An input device may include a sensor device or a user input device. Examples of user input devices include a keyboard, mouse, or touch screen.

When included, network system 868 may be configured to communicatively couple computer system 858 with one or more other computer systems. The network system may include wired and/or wireless communication devices compatible with one or more different communication protocols. The network system may be configured for communication via personal-, local- and/or wide-area networks.

The disclosure comprises, inter alia, configurations according to the following numbered examples.

Example 1. A method of manufacture of a device comprises: receiving a prescription defining a variable dielectric quantity over an array of target voxels; for each target voxel of the array, selecting for deposition at the target voxel, a material that, when deposited and solidified, urges the dielectric quantity at the target voxel toward a value prescribed for the target voxel according to the prescription, estimating an error between the dielectric quantity at the target voxel and the value prescribed for the target voxel, and compensating the error by selection of a material for deposition at a voxel adjacent the target voxel, wherein the selecting estimating, and compensating yields, for each material selected, a corresponding print map associating an amount of the material to each target voxel of the array; depositing each material selected according to the corresponding print map; and solidifying each material as deposited.

Example 2. The method of Example 1 wherein the array of target voxels is a three-dimensional array in three corresponding coordinates, and wherein the variable dielectric quantity defined by the prescription varies as a function of any, some or all of the coordinates.

Example 3. The method of Examples 1 or 2, wherein selecting for deposition comprises selecting from a pallet of materials usable concurrently in a printing apparatus.

Example 4. The method of any of Examples 1 through 3, wherein the dielectric quantity is a function of wavelength, and wherein estimating the error comprises estimating at two or more wavelengths.

Example 5. The method of any of Examples 1 through 4, wherein the device is a radio-frequency device, a microwave device, an infrared optical device, or a visible-light optical device.

Example 6. The method of any of Examples 1 through 5, wherein compensating the error comprises compensating according to an error-diffusion algorithm that distributes the error from each target voxel to one or more voxels adjacent the target voxel.

Example 7. The method of Example 3 further comprising receiving a set of error-diffusion parameter values, wherein the error-diffusion algorithm operates according to the set of error-diffusion parameter values.

Example 8. The method of Example 7 wherein the set of error-diffusion parameter values includes a threshold value, and wherein depositing each material selected comprises: for each corresponding print map, depositing only to voxels for which the amount of the material exceeds the threshold value.

Example 9. The method of Example 7 or 8, wherein the set of error-diffusion parameter values includes a kernel size and kernel shape defining a kernel of voxels adjacent the target voxel and a set of kernel coefficients controlling a distribution of the error among the kernel of voxels.

Example 10. The method of any of Examples 7 though 9, wherein the set of error-diffusion parameter values spans a designated scan path for material selection, starting at the target voxel.

Example 11. The method of Example 10 wherein the scan path is aligned to a trajectory of radiation traversing the device.

Example 12. The method of Example 10 wherein the scan path is determined based on a magnitude and direction of one or more gradients of the prescription.

Example 13. The method of Example 10 wherein the scan path is serpentine in two or more dimensions.

Example 14. The method of any of Examples 10 through 13, wherein the scan path is defined based on spatial or volumetric content of the prescription.

Example 15. The method of any of Examples 1 through 14, further comprising: receiving a set of print-parameter values; defining the array of target voxels based on the print-parameter values; and discretizing the prescription over the array of target voxels, wherein the error-diffusion algorithm operates according to the set of print-parameter values.

Example 16. The method of claim Example 15 wherein the set of print-parameter values includes a drop-size parameter value, a drop-volume parameter value, a drop-resolution parameter value, a drop-diffusivity parameter value, and/or a print-accuracy parameter value.

Example 17. The method of claim Example 7 further comprising receiving forecast data corresponding to the device and adjusting, based on the forecast data, one or more of the pallet of materials, the set of error-diffusion parameter values, or the set of print-parameter values.

Example 18. The method of Example 17 wherein the adjusting is enacted in a closed-loop manner to minimize a residual between the forecast data and idealized forecast data corresponding to the device.

Example 19. The method of Example 17 or 18, wherein the adjusting comprises an orthogonal polynomial decomposition.

Example 20. The method of any of Examples 1 through 19, wherein the selecting, estimating, and compensating comprises a gradient-descent, genetic, reinforced-learning, swarm, simulated-annealing, particle-swarm, multi-objective, adaptive, or other deterministic, stochastic, heuristic, machine-learning, or deep-learning optimization.

Example 21. The method of any of Example 1 through 20, wherein the dielectric quantity comprises a refractive index, a Zernike coefficient, a Fourier coefficient, a wavelet coefficient, a dispersion parameter, a partial-dispersion parameter, a Sellmeier representation, or a Cauchy representation.

Example 22. The method of Example 21 further comprising dynamically adjusting the set of error-diffusion parameter values according to a design-specific property of the device.

Example 23. The method of Example 15 wherein the array of target voxels is a first voxel array spanning a first portion of the device, and wherein each print map includes a plurality of preset values corresponding to a second voxel array spanning a second portion of the device.

Example 24. The method of Example 5 wherein the error-diffusion algorithm comprises a spatially adaptive algorithm, a multi-scale algorithm, a depth-dependent algorithm, a power-dependent algorithm, a content-aware algorithm, and/or a fractal-diffusion algorithm.

Example 25. The method of Example 18 wherein the residual is computed at two or more wavelengths.

Example 26. The method of Example 17 wherein the adjusting is responsive to geometric scale, applying different error-diffusion coefficients at different geometric scales to enhance an imaging quality of the device.

Example 27. The method of any of Examples 1 through 26, further comprising: interpolating the prescription among the array of target voxels; decomposing the prescription into a set of orthogonal basis functions evaluated at each target voxel of the array; generating a scan path for the error-diffusion algorithm based on a desired metric, along which scan path the error-diffusion algorithm is applied to the set of basis functions, to minimize a cost function; mapping a corresponding set of coefficients of the basis functions back to the array of target voxels to obtain target values of the dielectric quantity over the array of target voxels; modifying the prescription according to the mapping; and repeating said interpolating, decomposing, generating, and mapping until a desired cost function is achieved.

Example 28. The method of any of Examples 1 through 27, wherein the cost function comprises a wavefront error, Strehl ratio, side-lobes, gain, MTF, dispersion, or scatter at one or more wavelengths.

Example 29. The method of Example 10 wherein the scan path comprises a raster scan path, a random scan path, a space-filling scan path, a serpentine scan path, or a spiral-in scan path.

Example 30. The method of Example 10 or 29, wherein the scan path initiates at a surface of the device that first intercepts an incident radiation wavefront.

Example 31. The method of Example 10, 29, or 30, wherein the scan path is defined relative to a path of highest flux, power, or dispersion of incident radiation through the device.

Example 32. A device comprising: an array of voxels of solidified material defining at least one scan path along which an error in a variable dielectric quantity at a target voxel is distributed by successive deposition and solidifying of a selected material along the scan path, in accordance with a prescription for the device, wherein the prescription defines the dielectric quantity over the array of voxels. Naturally, this device may be fabricated using the methods of any of the foregoing Examples, and may include any of the structural features recited in the foregoing Examples.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of manufacture of a device, the method comprising:
   receiving a prescription defining a variable dielectric quantity over an array of a plurality of target voxels;
   receiving a set of error-diffusion parameter values;
   for each target voxel of the array:
      selecting, for deposition at the target voxel, a material from a pallet of materials usable concurrently in a printing apparatus that, when the material is deposited and solidified, urges the dielectric quantity at the target voxel of the variable dielectric quantity toward a value prescribed for the target voxel according to the prescription,
      estimating an error between the dielectric quantity at the target voxel and the value prescribed for the target voxel, and
      compensating the error by selection of a material for deposition at a voxel adjacent to the target voxel according to an error-diffusion algorithm that distributes the error from the target voxel to one or more voxels adjacent to the target voxel,
      wherein the selecting, estimating, and compensating yields, for each material selected, a corresponding print map associating an amount of the material to each target voxel of the array;
   depositing each material selected according to the corresponding print map; and
   solidifying each material as deposited;
   wherein the error-diffusion algorithm operates according to the set of error-diffusion parameter values;
   wherein the set of error-diffusion parameter values includes a kernel size and kernel shape defining a kernel of voxels adjacent to the target voxel and a set of kernel coefficients controlling a distribution of the error among the kernel of voxels.

2. The method of claim 1, wherein the array of the target voxels is a three-dimensional array in three corresponding coordinates, and wherein the variable dielectric quantity defined by the prescription varies as a function of any, some or all of the coordinates.

3. The method of claim 1, wherein the dielectric quantity at the target voxel of the variable dielectric quantity is a function of wavelength, and wherein estimating the error comprises estimating at two or more wavelengths.

4. The method of claim 1, wherein the device is a radio-frequency device, a microwave device, an infrared optical device, or a visible-light optical device.

5. The method of claim 1, wherein the set of error-diffusion parameter values includes a threshold value, and wherein depositing each material selected comprises:
   for each corresponding print map, depositing only to voxels for which the amount of the material exceeds the threshold value.

6. The method of claim 1, wherein the set of error-diffusion parameter values spans a designated scan path for material selection, starting at the target voxel.

7. The method of claim 6, wherein the designated scan path is aligned to a trajectory of radiation traversing the device.

8. The method of claim 6, wherein the designated scan path is determined based on a magnitude and direction of one or more gradients of the prescription.

9. The method of claim 6, wherein the designated scan path is serpentine in two or more dimensions.

10. The method of claim 6, wherein the designated scan path is defined based on spatial or volumetric content of the prescription.

11. The method of claim 1, further comprising:
   receiving a set of print-parameter values;
   defining the array of the target voxels based on the print-parameter values; and
   discretizing the prescription over the array of the target voxels,
   wherein the error-diffusion algorithm operates according to the set of print-parameter values.

12. The method of claim 11, wherein the set of print-parameter values includes a drop-size parameter value, a drop-volume parameter value, a drop-resolution parameter value, a drop-diffusivity parameter value, and/or a print-accuracy parameter value.

13. The method of claim 11, further comprising receiving forecast data corresponding to the device and adjusting, based on the forecast data, one or more of the pallet of materials, the set of error-diffusion parameter values, or the set of print-parameter values.

14. The method of claim 13, wherein the adjusting the one or more of the pallet of materials is enacted in a closed-loop manner to minimize a residual between the forecast data and idealized forecast data corresponding to the device.

15. The method of claim 13, wherein the adjusting the one or more of the pallet of materials comprises an orthogonal polynomial decomposition.

16. The method of claim 1, wherein the selecting, estimating, and compensating comprises a gradient-descent, genetic, reinforced-learning, swarm, simulated-annealing, particle-swarm, multi-objective, adaptive, or other deterministic, stochastic, heuristic, machine-learning, or deep-learning optimization.

17. The method of claim 1, wherein the variable dielectric quantity comprises a refractive index, a Zernike coefficient, a Fourier coefficient, a wavelet coefficient, a dispersion parameter, a partial-dispersion parameter, a Sellmeier representation, or a Cauchy representation.

18. The method of claim 17, further comprising dynamically adjusting the set of error-diffusion parameter values according to a design-specific property of the device.

19. The method of claim 1, wherein the array of the target voxels is a first voxel array spanning a first portion of the device, and wherein each print map includes a plurality of preset values corresponding to a second voxel array spanning a second portion of the device.

20. The method of claim 1, wherein the error-diffusion algorithm comprises a spatially adaptive algorithm, a multi-scale algorithm, a depth-dependent algorithm, a power-dependent algorithm, a content-aware algorithm, and/or a fractal-diffusion algorithm.

21. The method of claim 14, wherein the residual is computed at two or more wavelengths.

22. The method of claim 13, wherein the adjusting the one or more of the pallet of materials is responsive to geometric scale, applying different error-diffusion coefficients at different geometric scales to enhance an imaging quality of the device.

23. The method of claim 1, further comprising:
interpolating the prescription among the array of the target voxels;
decomposing the prescription into a set of orthogonal basis functions evaluated at each target voxel of the array;
generating a scan path for the error-diffusion algorithm based on a desired metric, along which scan path the error-diffusion algorithm is applied to the set of basis functions, to minimize a cost function;
mapping a corresponding set of coefficients of the basis functions back to the array of the target voxels to obtain target values of the variable dielectric quantity over the array of the target voxels;
modifying the prescription according to the mapping to obtain a modified prescription; and
repeating said interpolating, decomposing, generating, and mapping until a desired cost function is achieved;
wherein the selecting the material is according to the modified prescription.

24. The method of claim 23, wherein the cost function comprises a wavefront error, Strehl ratio, side-lobes, gain, MTF, dispersion, or scatter at one or more wavelengths.

25. The method of claim 6, wherein the designated scan path comprises a raster scan path, a random scan path, a space-filling scan path, a serpentine scan path, or a spiral-in scan path.

26. The method of claim 6, wherein the designated scan path initiates at a surface of the device that first intercepts an incident radiation wavefront.

27. The method of claim 6, wherein the designated scan path is defined relative to a path of highest flux, power, or dispersion of incident radiation through the device.

28. A method of manufacture of a device, the method comprising:
receiving a prescription defining a variable dielectric quantity over an array of a plurality of target voxels;
receiving a set of error-diffusion parameter values;
for each target voxel of the array:
selecting, for deposition at the target voxel, a material that, when the material is deposited and solidified, urges the dielectric quantity at the target voxel of the variable dielectric quantity toward a value prescribed for the target voxel according to the prescription,
estimating an error between the dielectric quantity at the target voxel and the value prescribed for the target voxel, and
compensating the error by selection of a material for deposition at a voxel adjacent to the target voxel according to an error-diffusion algorithm that distributes the error from the target voxel to one or more voxels adjacent to the target voxel,
wherein the selecting, estimating, and compensating yields, for each material selected, a corresponding print map associating an amount of the material to each target voxel of the array;
depositing each material selected according to the corresponding print map; and
solidifying each material as deposited;
wherein the error-diffusion algorithm operates according to the set of error-diffusion parameter values;
wherein the set of error-diffusion parameter values spans a designated scan path for material selection, starting at the target voxel.

29. A method of manufacture of a device, the method comprising:
receiving a prescription defining a variable dielectric quantity over an array of a plurality of target voxels;
interpolating the prescription among the array of the target voxels;
decomposing the prescription into a set of orthogonal basis functions evaluated at each target voxel of the array;
generating a scan path for an error-diffusion algorithm based on a desired metric, along which scan path the error-diffusion algorithm is applied to the set of basis functions, to minimize a cost function;
mapping a corresponding set of coefficients of the basis functions back to the array of the target voxels to obtain target values of the variable dielectric quantity over the array of the target voxels;
modifying the prescription according to the mapping to obtain a modified prescription; and
repeating said interpolating, decomposing, generating, and mapping until a desired cost function is achieved;

for each target voxel of the array:
- selecting, for deposition at the target voxel, a material that, when the material is deposited and solidified, urges the dielectric quantity at the target voxel of the variable dielectric quantity toward a value prescribed for the target voxel according to the modified prescription,
- estimating an error between the dielectric quantity at the target voxel and the value prescribed for the target voxel, and
- compensating the error by selection of a material for deposition at a voxel adjacent to the target voxel,
- wherein the selecting, estimating, and compensating yields, for each material selected, a corresponding print map associating an amount of the material to each target voxel of the array;

depositing each material selected according to the corresponding print map; and solidifying each material as deposited.

* * * * *